(12) United States Patent
Holleis et al.

(10) Patent No.: US 12,325,461 B2
(45) Date of Patent: Jun. 10, 2025

(54) STROLLER

(71) Applicants: CYBEX GmbH, Bayreuth (DE); GOODBABY CHILD PRODUCTS CO., LTD., Kunshan (CN)

(72) Inventors: Ralf Holleis, Bayreuth (DE); Junma Wang, Kunshan (CN); Xueming Yu, Kunshan (CN)

(73) Assignees: CYBEX Gmbh, Bayreuth (DE); GOODBABY CHILD PRODUCTS CO., LTD., Kunshan (CN)

( * ) Notice: Subject to any disclaimer, the term of this patent is extended or adjusted under 35 U.S.C. 154(b) by 435 days.

(21) Appl. No.: 17/753,730

(22) PCT Filed: Sep. 11, 2020

(86) PCT No.: PCT/EP2020/075515
§ 371 (c)(1),
(2) Date: Mar. 11, 2022

(87) PCT Pub. No.: WO2021/048384
PCT Pub. Date: Mar. 18, 2021

(65) Prior Publication Data
US 2022/0379945 A1 Dec. 1, 2022

(30) Foreign Application Priority Data

Sep. 12, 2019 (CN) .......................... 201910862093.1
Sep. 17, 2019 (DE) ..................... 20 2019 105 127.2

(51) Int. Cl.
*B62B 9/10* (2006.01)
*B62B 7/14* (2006.01)
*B62B 9/12* (2006.01)

(52) U.S. Cl.
CPC .............. *B62B 9/102* (2013.01); *B62B 7/142* (2013.01); *B62B 9/104* (2013.01); *B62B 9/12* (2013.01)

(58) Field of Classification Search
CPC B62B 9/102; B62B 9/12; B62B 9/104; B62B 7/145; B62B 7/142
See application file for complete search history.

(56) References Cited

U.S. PATENT DOCUMENTS 3,874,690 A 4/1975 Marrone
7,364,183 B2 * 4/2008 Lee .......................... B62B 7/142
280/47.38

(Continued)

FOREIGN PATENT DOCUMENTS

CN 1210701 A 3/1999
CN 201183515 Y 1/2009

(Continued)

OTHER PUBLICATIONS

"Chinese Application 202080076566.6, First Office Action dated Sep. 28, 2023", (Sep. 28, 2023), 18 pgs.

(Continued)

*Primary Examiner* — Emma K Frick
(74) *Attorney, Agent, or Firm* — Schwegman Lundberg & Woessner, P.A.

(57) ABSTRACT

The invention relates to a stroller comprising a stroller chassis and a child receiving device for receiving at least one child. The child receiving device can be oriented in at least two different orientations, in particular a forwards orientation and a rearwards orientation, relative to the stroller chassis, wherein at least one receiving section of the child receiving device is movable, in particular at least partly pivotal, such that at least one first and second setting of the child receiving device can be set, and a coupling device is provided and designed such that a conversion from at least (Continued)

one first orientation of the child receiving device to a second orientation is blocked in at least one first setting of the child receiving device.

15 Claims, 19 Drawing Sheets

(56) References Cited

U.S. PATENT DOCUMENTS

| | | | | |
|---|---|---|---|---|
| 8,567,866 | B2* | 10/2013 | Carimati Di Carimate | ................. B62B 7/14 297/487 |
| 8,596,670 | B2* | 12/2013 | di Carimate | ............ B62B 7/142 280/47.38 |
| 9,616,913 | B2 | 4/2017 | Wang | |
| 11,840,270 | B2* | 12/2023 | Holleis | .................... A47C 4/00 |
| 2008/0012268 | A1 | 1/2008 | Lee | |

FOREIGN PATENT DOCUMENTS

| | | | | |
|---|---|---|---|---|
| CN | 102159441 | A | | 8/2011 |
| CN | 102416975 | A | | 4/2012 |
| CN | 104340257 | A | | 2/2015 |
| CN | 205632635 | U | | 10/2016 |
| CN | 108146488 | A | | 6/2018 |
| CN | 109843644 | A | | 6/2019 |
| CN | 212709638 | U | * | 3/2021 |
| CN | 114104072 | A | * | 3/2022 |
| DE | 102014114413 | B3 | * | 2/2016 ............... B62B 7/14 |
| EP | 2433846 | A2 | | 3/2012 |
| EP | 2862781 | A2 | | 4/2015 |
| GB | 2430414 | A | | 3/2007 |
| JP | 2001097228 | A | | 4/2001 |
| JP | 3196997 | U | | 4/2015 |
| JP | 2016196281 | A | | 11/2016 |
| KR | 20200127466 | A | * | 11/2020 |
| WO | WO-2021048384 | A1 | | 3/2021 |

OTHER PUBLICATIONS

"International Application No. PCT/EP2020/075515, International Search Report and Written Opinion mailed Jan. 19, 2021", (Jan. 19, 2021), 16 pgs.

"Japanese Application No. 2022-516293, Notice of Reasons for Refusal dated Sep. 26, 2024", (Sep. 26, 2024), 12 pgs.

* cited by examiner

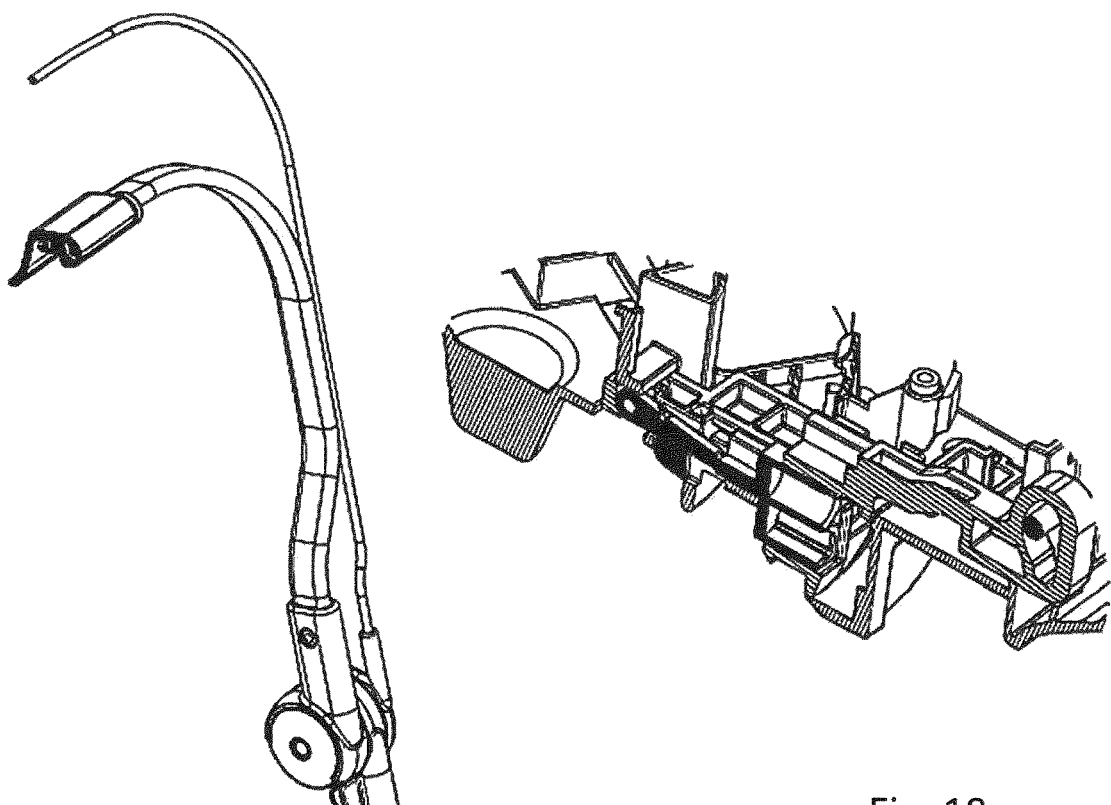
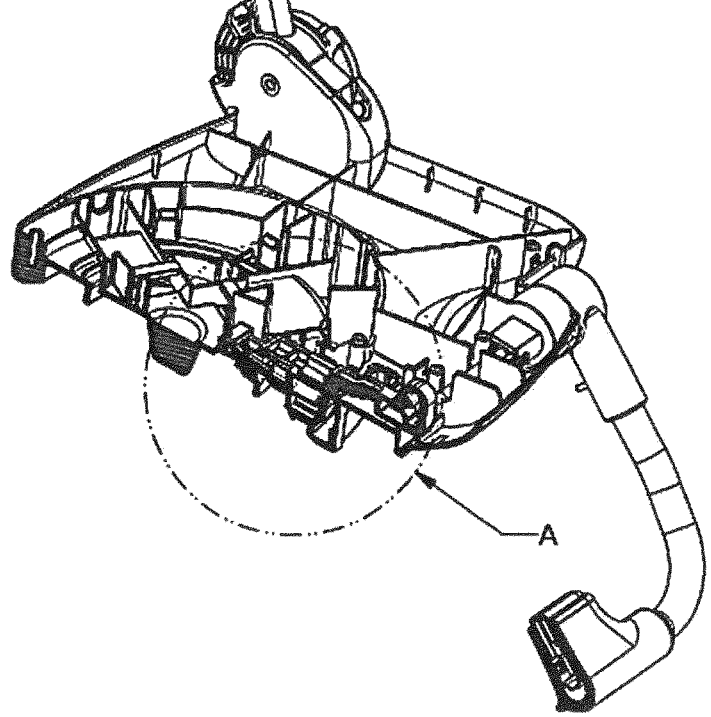
Fig. 18
Fig. 17

STROLLER

PRIORITY CLAIM TO RELATED APPLICATIONS

This application is a U.S. national stage filing under 35 U.S.C. § 371 from International Application No. PCT/EP2020/075515, filed on 11 Sep. 2020, and published as WO2021/048384 on 18 Mar. 2021, which claims the benefit under 35 U.S.C. 119 to Chinese Application No. 201910862093.1, filed on 12 Sep. 2019, and to German Application No. 20 2019 105 127.2, filed on 17 Sep. 2019, the benefit of priority of each of which is claimed herein, and which applications and publication are hereby incorporated herein by reference in their entirety.

The invention relates to a stroller comprising a stroller chassis and a child receiving device for receiving at least one child according to claim 1.

Stroller chassis with attachments rotatably arranged on them are known in principle. U.S. Pat. No. 3,874,690 A shows such an attachment which is rotatably arranged on a chassis. US 2008 0012268 A1 shows a stroller chassis with a seat attachment rotatably arranged on the chassis, wherein the seat attachment comprises various receiving sections to receive the individual body parts of the child.

It is an object of the invention to provide a stroller, comprising a stroller chassis as well as a child receiving device for receiving at least one child, wherein the child receiving device can be converted in the simplest possible and safest possible manner into two different orientations with respect to a stroller chassis. It is a further object of the invention to propose a corresponding method.

This object is solved in particular by a child seat according to claim 1.

In particular, the object is solved by a stroller, comprising a stroller chassis and a child receiving device (preferably an attachment, in particular a seat attachment and/or reclining attachment) for receiving at least one child, wherein the child receiving device can be oriented in at least two different orientations, in particular a forward orientation and a rearward orientation, with respect to the stroller chassis, wherein the child receiving device is movable at least in sections, in particular pivotable at least in sections. Preferably, the child receiving device is movable at least in sections, in particular pivotable at least in sections, in such a way that at least a first and a second position of the child receiving device are adjustable, wherein a coupling device is provided and designed in such a way that a transfer from at least a first orientation of the child receiving device to a second orientation is blocked in at least a first position of the child receiving device (and optionally released in at least a second position of the child receiving device).

According to a further (possibly independent or, alternatively, further developing) aspect of the invention, a stroller, in particular of the above type, is proposed, comprising a stroller chassis as well as a child receiving device for receiving at least one child, wherein the child receiving device is orientable relative to the stroller chassis in at least two different orientations, in particular a forward orientation and a rearward orientation, wherein the child receiving device has at least two receiving sections movable relative to one another, in particular pivotable relative to one another, preferably at least one front section, in particular a leg section, and one rear section, in particular a buttocks and/or back section, wherein the receiving sections are movable relative to one another, in particular pivotable (relative to one another). Preferably, the receiving sections are movable, in particular pivotable, relative to one another in such a way that the child receiving device can be transferred into a storage position Alternatively or additionally, the front section is pivotable upwardly such that a distal end of the front section lies above a proximal end of the front season.

The orientation of the child receiving device with respect to the stroller chassis means in particular an orientation of the entire child receiving device (or the entire corresponding attachment) with respect to the stroller chassis. A change in orientation is characterized in particular by a rotation about an at least substantially (in particular exact) vertical axis. Essentially vertical means in particular that a deviation from the vertical is less than 30°, preferably less than 10°, still further preferably less than 3°. The respective orientation can in particular also be equated with a respective viewing direction of the child, or a change in orientation is present if the viewing direction of the child (e.g. with respect to a slider and/or with respect to a direction of travel during forward travel) changes (for example by 180°). Particularly preferably, at least two (or exactly two) different orientations, in particular a forward orientation and a backward orientation, can be set. In the forward orientation, the child preferably faces away from the person pushing and/or in the direction of travel. In the rearward orientation, the child preferably looks toward the person pushing and/or against the direction of travel.

A child receiving device is understood to mean a device that is structured, in particular, to (completely) receive the child. In this respect, the child receiving device has, in particular, a back section (for receiving the back of the child), a buttocks section (for receiving the buttocks of the child) and a legs section (for receiving the legs of the child).

Preferably, the child receiving device is (at least) movable in sections (or comprises at least one movable receiving section). This is to be understood in particular as a movement that is not comparable to a change in orientation. The movement may be translator and/or rotatory. A translator movement, for example, would be a pushing together of several sections of the child receiving device. A rotatory movement, would be in particular a pivoting of a receiving section of the child receiving device, in particular about a (substantially) horizontal axis.

Insofar as different positions are mentioned, this is to be understood in particular as a distinction from different orientations. A first position of the child receiving device differs in particular from a second position of the child receiving device if at least one (receiving) section of the child receiving device changes its orientation and/or its position relative to at least one further (receiving) section of the child receiving device.

A storage position is to be understood in particular as a non-use position in which the child receiving device cannot be used in such a way that a child can be received (for example, because the child receiving device is folded and/or pushed together in such a way that a receiving space and/or receiving surface is no longer formed in which a child could (meaningfully) be placed or laid).

In contrast, a position of use is preferably characterized in that a child can be placed or laid into the child receiving device. Typical examples of use positions are a sitting position (in which the receiving sections can be arranged, for example, in a stair-like manner) or a lying position (in which the receding sections can be arranged in a flattened manner compared to the sitting position, in particular at least substantially all extending in the same direction).

A typical example of a storage position (or non-use position) would be a position in which one leg section is pivoted upward. In such a position, the child can no longer be (meaningfully) admitted to the child receiving device.

In one embodiment, at least one storage position may differ from at least one use position in that an extension in the horizontal direction (and in particular pointing from the rear to the front) is smaller in the storage position than in the use position Insofar as individual (in particular the front or rear) receiving sections of the child receiving device are concerned, these are in particular sections which form at least 5% by weight, preferably at least 35% by weight and/or at most 95% by weight, further preferably at most 85% by weight of the child receiving device. Furthermore, the respective section (e.g. front or rear section) comprises a part of a contact surface which, in use, faces the child so that the child can rest or sit on it (e.g. a surface on which the buttocks rest or are supported).

One (optionally also independent) idea of the invention is to couple a change of position of at least one section of the child receiving device with the possibility to what extent a change of orientation can be performed or not. Particularly preferably, therefore, the possibility of carrying out a change of orientation (for example by 380°) is blocked in a first position of the child receiving device and (at least in principle) released in a second position.

Blocking is preferably understood to mean that the orientation cannot be changed (without changing the position). However, it may also mean optionally that it is difficult to change the orientation (for example, because at least one additional operating element must be operated and/or because access to an operating element is difficult).

Preferably, a blocking device (locking device) may be present that is indirectly or directly coupled to the position of the child receiving device. For example, the blocking device (locking device) can be released when the child receiving device is in a second position or is transferred from a first position to the second position. In particular, the blocking device (locking device) can be released by transferring the child receiving device from a first position to the second position.

Preferably, a change of orientation of the child receiving device is enabled in at least one (the second) position, which may specifically mean that a change of orientation can then be readily effected (in particular without actuating a further operating element). However, this can also mean that a change in orientation can take place at least when at least one operating element and/or an actuating device is actuated.

As a result of such a coupling of the change of position of the child receiving device with the change of orientation or the possibility for such a change, an orientation change can be made possible in a simple way when this is useful or desired (for example when no child can be accommodated in the child receiving device). Thus, the operation is simplified in a safe way.

A further (optionally independent) core idea of the invention is to propose, on the one hand, a child receiving device which can be transferred to different orientations and (on the other hand) can be transferred to a storage position. By combining these features, it is achieved in a synergistic manner that a change of orientation can be made comparatively easily (namely, when the storage position is present). This also improves in a simple way a safe operation of the stroller.

Preferably, the stroller or at least one connecting device between the child receiving device and the stroller chassis is configured such that a change In orientation (i.e., in particular, rotation about an at least substantially vertical axis) of the child receiving device occurs or can occur in a state in which the child receiving device and the stroller chassis are connected to each other (rotatable relative to each other).

In particular, the stroller or at least, one connecting device between the child receiving device and the stroller chassis is configured such that it is not necessary to lift and/or detach or remove the child receiving device (completely) from the stroller chassis to change the orientation with respect to the stroller chassis.

Preferably, the child receiving device remains on the stroller chassis during the change in orientation.

In particular, the stroller or its components, stroller chassis and child receiving device, shall be configured in such a way that a change of orientation (if allowed or not blocked) can be performed when child receiving device and stroller chassis are (rotatably) connected to each other. Thus, in particular, it should not be necessary to completely remove the child receiving device from the stroller chassis (in order to perform the orientation change). Alternatively, however, this would also be conceivable.

In general, the child receiving device is preferably detachable (i.e., completely removable) from the stroller chassis, preferably by means of at least one detaching device.

Preferably, the child receiving device constitutes less than 50% by weight of the stroller and/or at least 5% by weight of the stroller.

Preferably, the child receiving device has at least two receiving sections which are movable (rotationally and/or transitionally) relative to one another, in particular pivotable relative to one another, preferably at least one front section, in particular a leg section (or a combined buttocks and leg section) and one rear section, in particular a buttocks and/or back section (in particular either a buttocks section, a back section or a combined buttocks and back section, preferably a buttocks section), wherein the coupling device is provided and designed in such a way that a transfer from at least a first orientation of the child receiving device to a second orientation is blocked in at least a first relative position of the two receiving sections with respect to one another (and, optionally, in at least a second relative position of the two receiving sections with respect to one another).

The front section is preferably a foremost section, in particular leg section (or combined buttocks and/or leg section). In particular, the foremost section is intended to comprise a foremost end of the child receiving device. Preferably, a front (or foremost/distal) end of the front section in a/the second relative position is above a proximal (rear) end In general, the front section may form only a leg section (to accommodate at least sections of the legs, especially from the knees down, of the child) or a combined leg-buttocks section. The rear section may be considered to be, in particular, a buttocks section or a combined buttocks and back section.

Preferably, the stroller has a pusher for pushing the stroller.

According to an independent (but preferably further developing) idea of the invention, the stroller comprises a stroller chassis as well as a child receiving device and a slider, wherein the slider extends at least in sections below a level of a (the) buttocks section (in at least one, optionally all, operating position(s) or use position(s)). In particular, the slider may extend over at least 5%, preferably at least 10%, of its vertical extension (in at least one use position, optionally all use positions) below the level of the buttocks section. Alternatively or additionally, the slider may extend over at least 5%, preferably at least 15% of its horizontal extension (in at least one, optionally all, states of use) below a level of the buttocks section. The level of the buttocks section is to be understood in particular as a horizontal plane which (in the respective state of use) has the lowest point of the buttocks section. In particular, this effectively facilitates a change of orientation.

Preferably, the child receiving device and the stroller chassis are connected to each other in a (the) buttocks section of the child receiving device. Alternatively or additionally, the child receiving device and the stroller chassis are connected to each other at an underside of the child receiving device. Such measures can also further simplify the change of orientation.

In embodiments, the child receiving device can be brought into at least one use position, wherein a (the) front receiving section, in particular leg section, of the child receiving device in a first use position preferably extends at least substantially in the same direction as a rearwardly adjoining receiving section, in particular buttocks section, of the child receiving device Alternatively or additionally, in a second position of use, a (the) front receiving section(s) can preferably extend in a downwardly bent manner relative to a receiving section, in particular buttocks section, adjoining to the rear.

In one embodiment, the child receiving device can be brought into at least one non-use position, in which a (the) front receiving section and/or a/the rear receiving section is (are) preferably pivoted upwards and/or inwards relative to at least one use position. The non-use position can be characterized, for example, in that a rear receiving section (in particular back section) together with the buttocks section encloses an angle of less than or equal to 90°, optionally less than or equal to 45° and/or is pivoted upwards (beyond a horizontal position) into a (the) leg section (front section) and/or encloses with the buttocks section an angle of less than or equal to 180°, preferably less than or equal to 135°, optionally less than or equal to 90°. Optionally, a non-use position may also be characterized in that the front section (leg section) includes an angle of greater than or equal to 270°, optionally greater than or equal to 315°, or greater than or equal to 350° with respect to the buttocks section.

As far as the angular relationships of the individual receptacle sections are concerned, this refers in particular to the angle that results or would result (if this is not possible) if the 0° angle is assumed to be a position in which the surfaces of the individual receptacle sections facing the child in use are in contact (or are guided towards each other).

In a specific embodiment, the child receiving device can be detached from the stroller chassis. In such a case, an actuating device (operating element) for releasing the child receiving device can preferably not be accessible or (only) be accessible with difficulty when the child receiving device is in a position of use. More difficult access means, for example, an access which is possible from only fewer (in particular more unfavorable) directions (compared to the non-impeded access). In particular, access can be made more difficult by the fact that the actuating device (the operating element) of the child receiving device is located at least partiality in the at least one position of use (or all positions of use). This further improves the safety of the stroller. This idea is also disclosed and claimed as an independent aspect herein.

The child receiving device may comprise or be formed by a seat attachment. Alternatively or additionally, the child receiving device may comprise a reclining attachment or be formed by such an attachment.

Movements of a (the) back section and a (the) leg section (each) relative to a (the) buttocks section may be coupled to each other. Preferably, however, a movability of the back section (on the one hand) and leg section (on the other hand) are not coupled, at least not forcibly coupled. Preferably, the back season shall be movable without having to move (pivot) the leg section. Conversely, the leg section should be movable (pivotable) without having to pivot the beck season.

As a further developed idea (or also as an independently inventive idea), a stroller is further proposed in which a transfer of at least one section of the child receiving device from a first position to a second position is possible only after a lock has been released and/or a transfer of at least one section of the child receiving device from a third position to a fourth position of at least one section of the child receiving device is possible without releasing a/the lock, in particular in a ratchet-like manner, wherein the third position preferably corresponds to the second position and/or the fourth position preferably corresponds to the first position.

Preferably, a downward movement, in particular a downward pivoting, of at least one section of the child receiving device is only possible after a lock has been released and/or an upward movement, in particular an upward pivoting, of at least one section of the child receiving device is possible without releasing a/the lock, in particular in a ratchet-like manner.

Preferably, a transfer of at least one section of the child receiving device from one position to another is possible only after a lock has been released, and/or a transfer of at least one section of the child receiving device from one (possibly the other) position to another (possibly the one) position is possible without releasing a lock, in particular in a ratchet-like manner.

In one embodiment, a transfer of at least one section of the child receiving device is possible without releasing a lock, in particular in a ratchet-like manner, if the weight force of a child received by the child receiving device counteracts the transfer. Alternatively or additionally, a transfer of at least one section of the child receiving device is possible only after removal of a lock, if the respective transfer is supported by the weight force of a child received by the child receiving device.

The above-mentioned object is further solved in particular by a method for adjusting a stroller, in particular of the above type, comprising a stroller chassis and a child receiving device for receiving at least one child, it being possible for the child receiving device to be oriented with respect to the stroller chassis in at least two different orientations, in particular a forward orientation and a rearward orientation, wherein at least one section of the child receiving device is moved, in particular pivoted at least in sections, and a transfer From at least a first orientation of the child receiving device to a second orientation is thereby released. Preferably, the child receiving device is subsequently transferred with respect to the stroller chassis after the release from the first orientation, in particular the forward orientation, to the second orientation, in particular the rearward orientation. Further method features will be apparent from the above description of the stroller, in particular the corresponding configurations and functions. In this respect, the functional features in particular can be carried out as method steps.

In summary, according to the invention, a stroller comprising a stroller chassis as well as a child receiving device is proposed, wherein the child receiving device (the attachment) can be rotatably arranged on the stroller chassis and preferably comprises a back section, a buttocks section and a leg section. The leg section can be adjustably (pivotably) arranged relative to the buttocks section such that at least two different positions can be assumed: a first position in which the leg section extends (at least substantially) in the same direction as the buttocks section, and a second position in which an angle between the leg section and the buttocks section is (substantially) less than 180°.

With regard to the prior art, it was recognized in particular that the solutions there are either not very convenient, in particular because they partly do not have a (pivotable) leg section, or that a possibly existing pivotable leg section obstructs the rotation of a child receiving device (an attachment) with respect to the stroller chassis, or that the stroller chassis must have a comparatively special design which ensures sufficient space on all sides. In the fatter case, then, for example, there cannot be provided on the stroller chassis any (two) push rods passing laterally past the child receiving device (the attachment), but the respective push rod must be designed in such a way that sufficient space remains laterally or, optionally, also downwardly for changing the orientation of the child receiving device. In contrast, according to the invention, in particular a child receiving device is provided (or a corresponding stroller) which is comfortable and safe for a child received in the child receiving device and shows comparatively little restriction with respect to a construction of a stroller chassis. In general, a comparatively safe stroller can thereby be obtained in a simple and inexpensive manner.

In a first embodiment of the child receiving device (the attachment), this concerns a seat attachment having (at least) a back section, a buttocks section, and a leg section. The leg section is adjustable, in particular pivotable, relative to the buttocks section and can assume at least two positions of use. In a first position of use, the leg section extends at least substantially in the same direction as the buttocks section (e.g. 175°-200°), and in a second position of use, an angle between the leg section and the buttocks section is more than 180°, in particular 185°-270°, preferably 225°-270°. Between the two use positions, further use positions may optionally be provided. The leg section may further assume a non-use position in which an angle between the leg section and the buttocks section is less than 180°, in particular 175°-5°, preferably 135°-45°. At least one (preferably all) of the use position(s) is (are) lockable. The non-use position may be non-lockable or, alternatively, lockable.

Preferably, the back section is also adjustable, in particular pivotable, relative to the buttocks section and can also assume at least two positions of use, namely a first position of use in which the back section extends at least substantially in the same direction as the buttocks section (e.g. 160°-185°), and a second position of use with an angle between the back section and the buttocks section of less than 180°, in particular 175°-90°, preferably 135°-90°. Between the two use positions, further use positions can optionally be provided. In principle, non-use positions can also be provided for the back section, in particular for folding the seat. At least one (preferably all) of the use positions is (are) lockable. An optionally provided non-use position can be non-lockable or, alternatively, lockable.

According to the embodiment, the release of the lock between the seat attachment and the chassis to enable rotation takes place by transferring the leg section from one of its use positions to its/a non-use position. This ensures, in particular, that the leg section does not protrude in a horizontal direction from the seat section to such an extent that it would impede or block rotation when the seat attachment is rotated relative to the chassis. At the same time, it is ensured in particular that rotation can only take place when no child is accommodated in the seat attachment, making possible injuries to the child (e.g. crushing between the seat attachment and the chassis) less likely and increasing safety. Overall, the solution is simple and cost-effective.

In a second embodiment of the attachment, said attachment is a reclining attachment that also includes (at least) a back section, a buttocks section, and a leg section. In this embodiment, both back section and leg section may each have only one position of use in which they extend at least substantially in the same direction as the buttocks section. In this regard, the back section and buttocks section may include an angle of 160°-185°, preferably 175°-185°. Leg section and buttocks section may include an angle of 160°-185°, preferably 175°-185°. Optionally (but not necessarily), other positions of use are provided in which the angle between the back section and the buttocks section is smaller and the angle between the leg section and the buttocks section is larger than in the aforementioned position of use. The leg section may further have a non-use position in which an angle between the leg section and the buttocks section is less than 180°, in particular 175°-5°, preferably 135°-45°. Also, the back section may preferably assume a further position (use position or non-use position) in which an angle between the back section and the buttocks section is less than 180°, in particular 175°-5°, preferably 135°-45°. In particular, the non-use position of the leg section and the further position of the back section should be able to be assumed simultaneously. The non-use position of the leg section and, if applicable, the further position of the back section can each be non-lockable or, alternatively, lockable.

Preferably, releasing the lock between the reclining attachment and the chassis to allow rotation is carried out (at least) by transferring the leg section from its/a use position to its/a non-use position. This ensures that the leg section does not protrude in a horizontal direction from the buttocks season to such an extent that it would impede or block rotation when the reclining attachment is rotated relative to the chassis. Preferably, the release of the lock between the reclining attachment and the chassis to allow rotation shall additionally depend on the back section being in the further position. Preferably, when rotation is released, the leg season and the back section shall be either at least substantially parallel to each other and/or at least substantially perpendicular to the buttocks section, or such that the leg section and the buttocks section enclose an acute angle and are (at least partially) covered by the back section. This provides a simple and inexpensive solution, while allowing rotation of the attachment without removing it from the chassis.

In order to enable rotation of the respective attachment relative to the chassis, a connection between the seat attachment or reclining attachment and the chassis is preferably made at the buttocks section of the respective attachment, preferably on the underside of the seat section. To enable rotation of the respective attachment, in particular seat attachment, relative to the chassis, a connection between attachment and frame is made at the buttocks section of the seat attachment, preferably on the underside of the seat section. For this purpose, for example, the mechanism known from CM 201183515 V or any other mechanism may be provided. The respective attachment can be locked in at least one position, preferably in at least two positions, relative to the chassis so that no rotation can take place. Preferably, this is a forward position and/or a rearward position.

For locking (concerning all aforementioned locks), for example, an engagement of an element in a counter structure can be realized.

Preferably, a transfer of the child receiving device between different orientations is feasible by, preferably exclusively by, rotation of the child receiving device relative to the stroller chassis, in particular about an at least substantially vertical axis.

In embodiments, transferring the child receiving device between different orientations is feasible without lifting the child receiving device relative to the stroller chassis and/or completely detaching the child receiving device from the stroller chassis.

In a non-use position, a/the front receiving section, in particular a/the leg section, may enclose an angle of less than 180°, in particular of at most 135°, with respect to a/the rear receiving section, in particular a/the buttocks section.

Further embodiments are apparent from the subclaims.

In the following, the invention is also explained with regard to further features and advantages on the basis of the figures, wherein:

FIG. 17 shows an illustration analogous to FIG. 16 with further omission of individual elements;

FIG. 18 shows an enlargement of section A from FIG. 17;

In the following description, the same reference numbers are used for the same parts and parts with the same effect.

Figure 1:
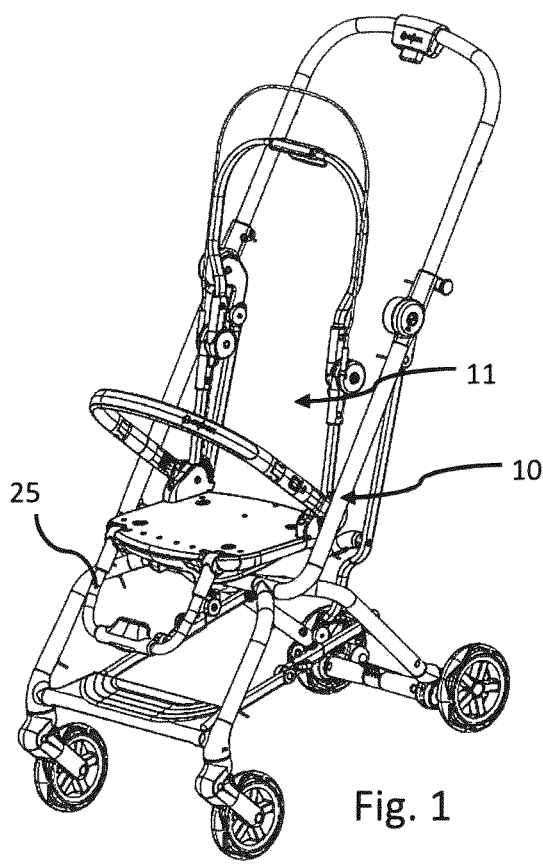
FIG. 1 shows an oblique view of a stroller according to the invention.

FIG. 1 snows a stroller according to the invention with stroller chassis 10 and child receiving device 11.

Figure 2:
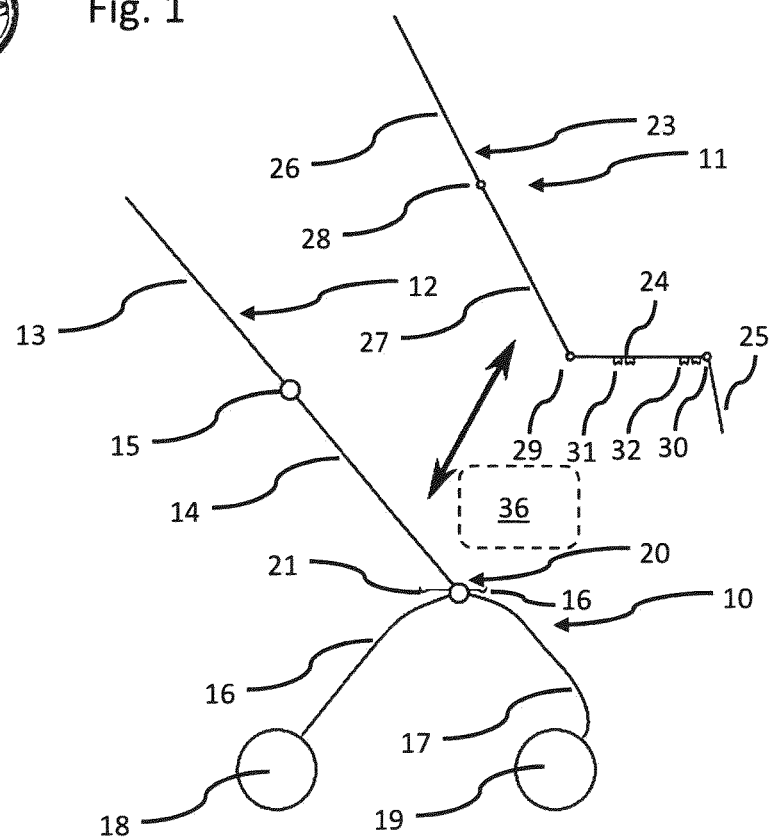
FIG. 2 shows a schematic representation of a stroller according to the invention comprising a stroller chassis and a child receiving device, wherein the child receiving device is removed from the chassis.

FIG. 2 shows in schematic view a first embodiment of the stroller according to the invention, comprising a stroller chassis 10 as well as a child receiving device 11, which is here removed from the stroller chassis.

The stroller chassis 10 includes a slider 12 having an upper slider section 13 and a lower slider section 14. The upper slider section 13 and the lower slider section 14 are (pivotally) connected to each other by at least one joint 15.

Furthermore, according to the embodiment, the stroller chassis 10 comprises at least one rear wheel strut 16 and at least one front wheel strut 17 (optionally at least two rear wheel struts and two front wheel struts, or one rear wheel strut and two front wheel struts, or two front wheel struts and one rear wheel strut, respectively). The respective rear wheel strut 16 or front wheel strut 17 can be assigned (at least) one rear wheel 18 or Front wheel 19.

The stroller chassis 10 further comprises a fastening device 20, by means of which the child receiving device 11 can be (rotatably) fastened (optionally, a joint for folding the stroller chassis may additionally be provided there).

A locking device 21 enables a rotational function (of the child receiving device 11 with respect to the stroller chassis 10) to be locked. A (further) locking device 22 is provided to secure (or lock) the child receiving device 11 to the stroller chassis 10.

The child seat 11 has a back section 23, a buttocks section 24, and a leg section 25. The back section 23 can in turn be divided into an upper back section 26 and a lower back section 27. Upper and lower back sections 26, 27 are connected to each other by a joint 28. Similarly, back section 23 (or lower back section 27) and buttocks section 24 are connected to each other via a joint 29. Buttocks section 24 and leg section 25 are connected to each other via a joint 30.

Furthermore, the child receiving device 11 has a locking structure 31 as well as a locking structure 32. The locking structure 31 cooperates with the locking device 21. The locking structure 32 cooperates with the locking device 22.

Figure 3:
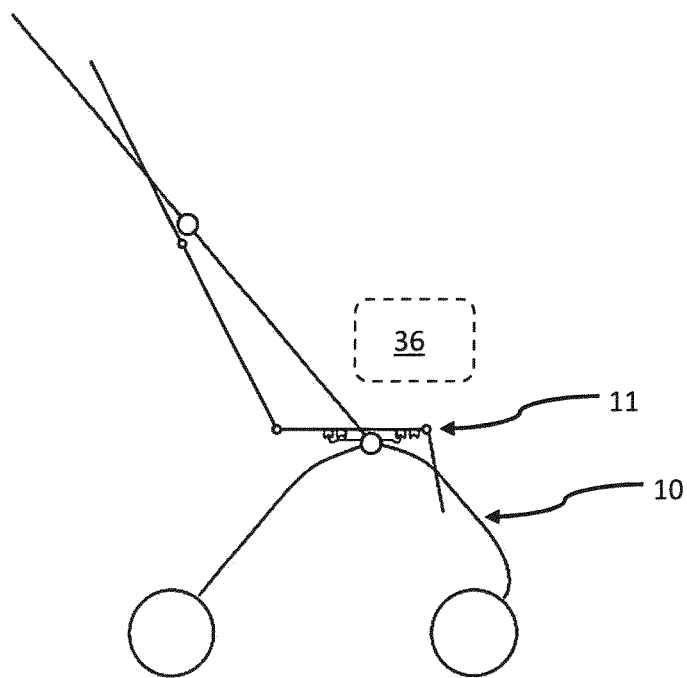
FIG. 3 shows the stroller according to FIG. 2 in sitting position and forward orientation.

FIG. 3 shows the stroller according to FIG. 2, wherein here the child receiving device 11 is attached to the stroller chassis 30. Furthermore, the child receiving device 11 is in a forward orientation (with the child facing in the direction of travel).

Figure 4:
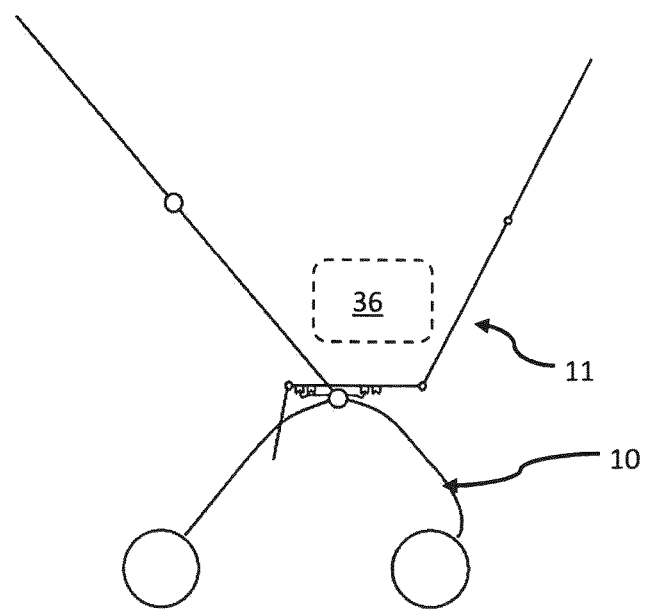
FIG. 4 shows the stroller according to FIG. 2 in sitting position and backward orientation.

Accordingly, FIG. 4 shows the stroller as shown in FIGS. 2 and 3, but in contrast to FIG. 3, the child receiving device 11 is oriented in the rearward direction (in which the child faces opposite to the direction of travel).

In this respect. FIGS. 3 and 4 show a seated position of the child receiving device (in which the child can sit).

Figure 5:
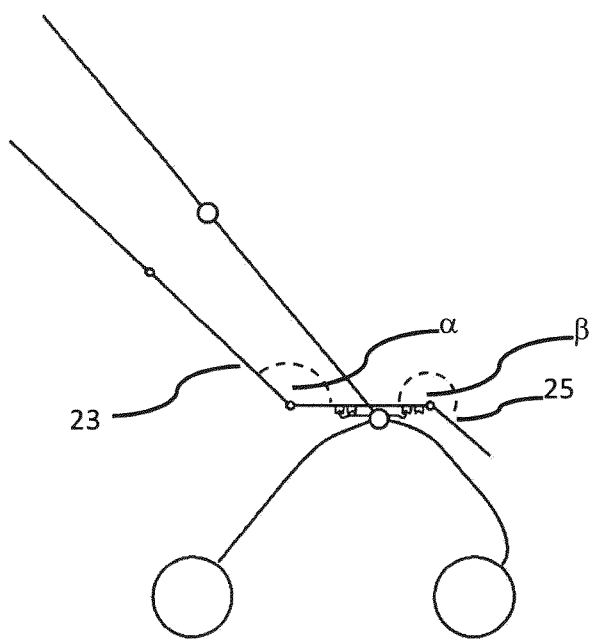
FIG. 5 shows the stroller according to FIG. 2 in an intermediate (semi-recumbent) position in forward orientation.
Figure 6:
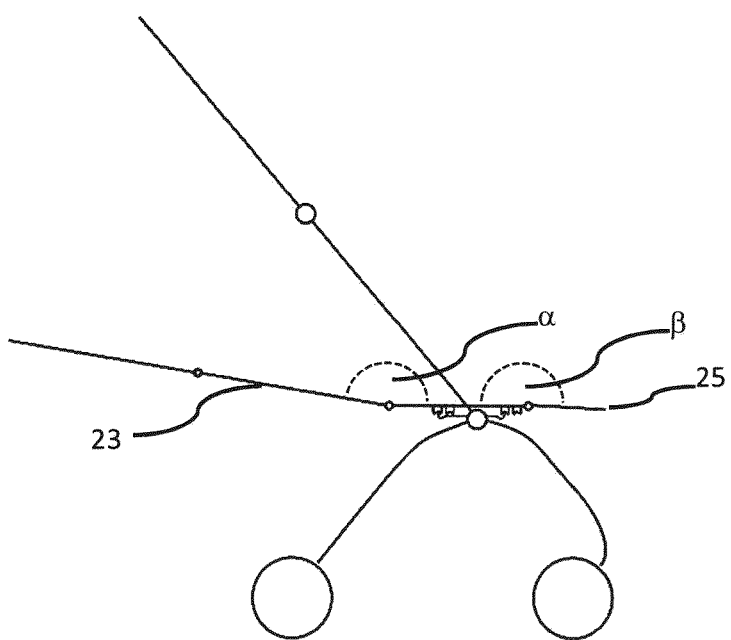
FIG. 6 shows the stroller according to FIG. 2 in a reclining position and forward orientation.

FIG. 5 again shows the child seat according to FIGS. 2-4 in forward orientation. In FIG. 5, however, both the back section 23 and the leg section 25 are flattened compared to FIGS. 3 and 4, so that a semi-recumbent intermediate position is set overall. An angle α between back section 23 and buttocks section 24 is increased for this purpose (compared to FIGS. 3 and 4). An angle β between buttocks section 24 and leg section 25 is reduced. FIG. 6 again shows a lying position in which the angle α is further increased (compared to FIG. 5) and the angle 3 is further decreased (compared to FIG. 5). In other words, both back section 23 and leg section 25 are further flattened so that the child can be comfortably.

FIGS. 3-6 each show (different) positions of use.

Figure 7:
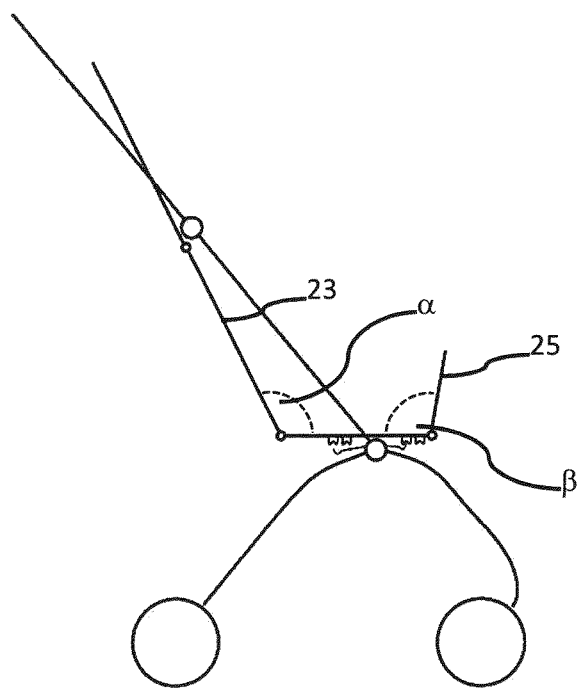
FIG. 7 shows the stroller according to FIG. 2 in a non-use position; shows the stroller shown in FIG. 2 in a non-use position and with FIG. 8 the back and leg sections substantially vertical.
Figure 8:
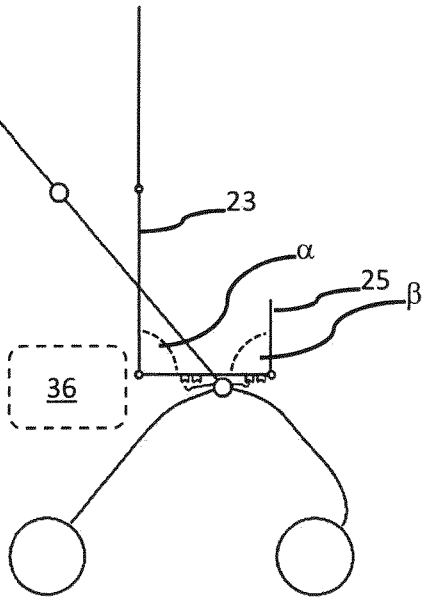

In FIG. 7 again a non-use position s shown. The back section 23 is here in the position according to FIG. 3 (which is not mandatory). The leg section is in an upwardly pivoted position so that the angle β is less than 130° (specifically less than 135°), but (still) greater than 90°. Another (even more compact) non-use position of the child receiving device 11 is shown in FIG. 8. There, angle α as well as β are both 90°.

Figure 9:
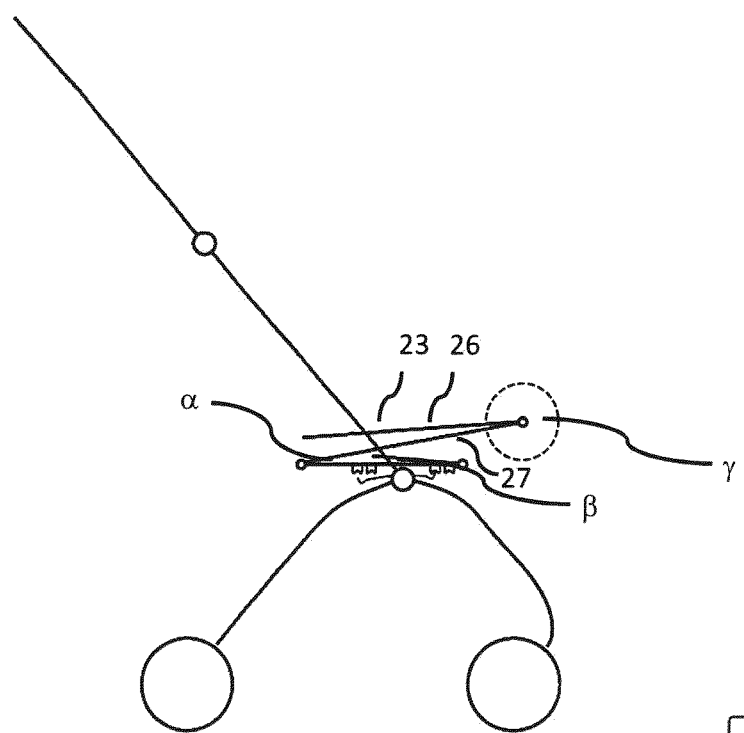
FIG. 9 shows the stroller according to FIG. 2 in a compact non-use position.

Finally, an (even more compact) non-use position of the child receiving device 11 is shown in FIG. 9. There, the angles α and β are smaller than 30°, optionally also smaller than 10°. Furthermore, the upper back section 26 is swung in (folded) relative to the lower back section 27, so that an angle γ between the upper back section 26 and the lower back section 27 is greater than 330°.

With regard to the definition of the angle, it should be noted once again that a 0° angle (which may only be theoretically achievable due to the seat design) is always assumed to be achieved when the surfaces of the child receiving device 11 facing the child are guided towards each other.

Figure 10:
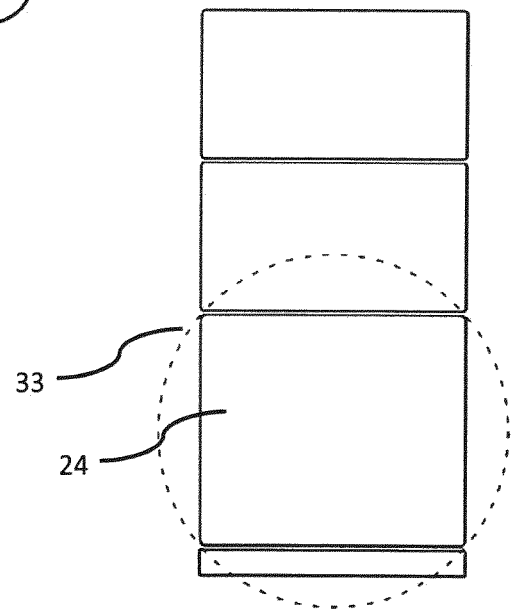
FIG. 10 shows a child receiving device according to FIG. 2 from above.

FIG. 10 shows the child receiving device 11 in a top view. Furthermore, a circle 33 is shown which is swept by the buttocks section 24 when the same is rotated (about a vertical axis at the center point) (in a top view) This circle indicates (schematically) where frame components may not be located when the buttocks section is rotated (in a horizontal position) to change orientation (particularly from forward to backward orientation or vice versa) unless they are located below or above an area occupied by the other sections of the child receiving device 11, namely in particular the leg section 25 and/or the back section 23 (respectively its upper and lower back sections 25, 26).

Figure 11:
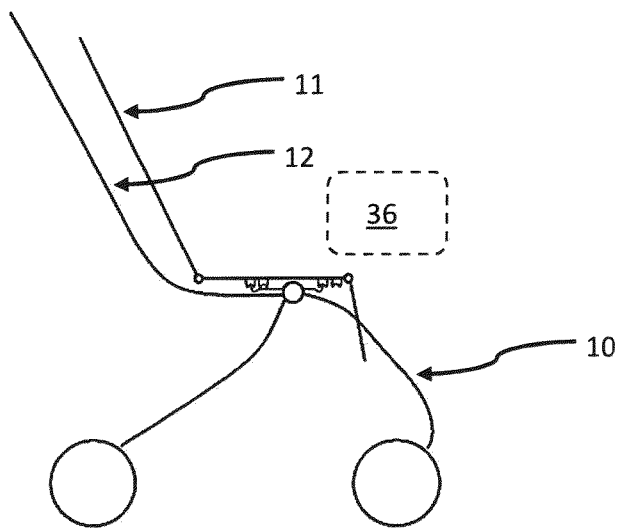
FIG. 11 shows a schematic illustration of a second embodiment of the stroller in the sitting position and forward orientation.

FIG. 11 shows a second embodiment of the stroller. A child receiving device 11 designed as a seat attachment is arranged on the stroller chassis 10 in forward orientation. The slider 12 is designed here (in deviation from FIGS. 2-9) in such a way that It extends partially under the leg section 24 and does not impede the rotation of the child receiving device 11 in this area. If, for example, the leg section 24 is now brought into a position analogous to one of FIGS. 7-9, the child receiving device 11 can be transferred in a simple manner into a position of use analogous to FIG. 4.

Figure 12:
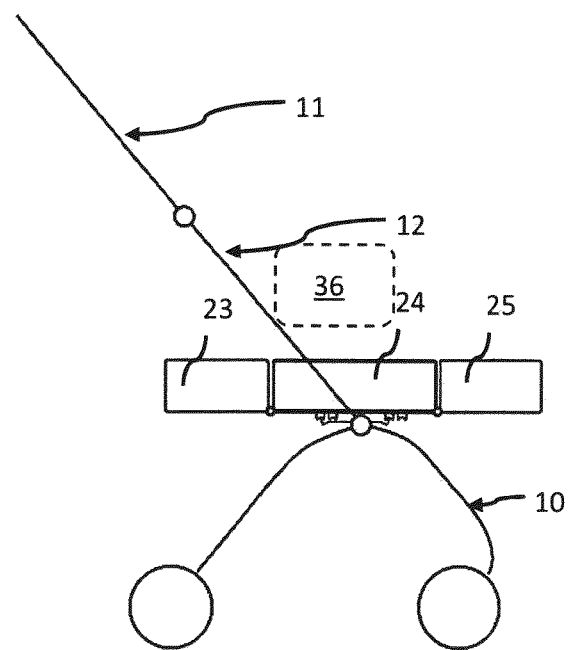
FIG. 12 shows a schematic representation of a third embodiment of the stroller.
Figure 13:
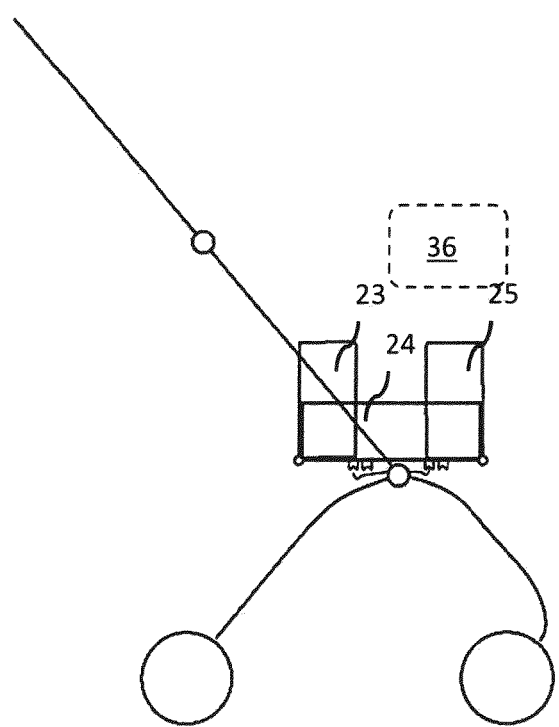
FIG. 13 shows the stroller according to FIG. 12 in a non-use position.

FIGS. 12 and 13 show a further embodiment of the stroller according to the invention. Here, the child receiving device 11 is designed as a reclining attachment. The stroller chassis 10 may (but need not) be designed as shown in the embodiments according to FIGS. 2-11. A reclining attachment means, in particular, an attachment which has a position of use in which all sections of the child receiving device 11 (on which the child lies) extend at least substantially horizontally. If necessary, only one use position can also be adjustable in this sense.

The child receiving device 11 according to FIGS. 12 and 13 has a back section 23, a buttocks section 24 and a leg section 25. The back section 23 and the buttocks section 24 can be pivoted towards each other via a joint 34. The buttocks section 24 and leg section 25 can be pivoted towards each other via a joint 35.

In a non-use position according to FIG. 11, both back section 23 and leg section 25 are pivoted (upward) relative to the buttocks section. However, a non-use position can also be realized in that only back section 23 or only leg section 25 are pivoted (upward).

In all embodiments, the ability to change orientation (for example, from FIG. 3 to FIG. 4) depends on the position in which the child receiving device 11 is located, in particular whether the respective leg section 25 is pivoted upward (to a non-use position) relative to the buttocks section 24 (as shown, for example, in FIGS. 7-9 and 13).

For this purpose, a coupling device 36 not shown in detail or purely schematically as a dashed square in FIGS. 2 to 13 is provided.

Figure 14:
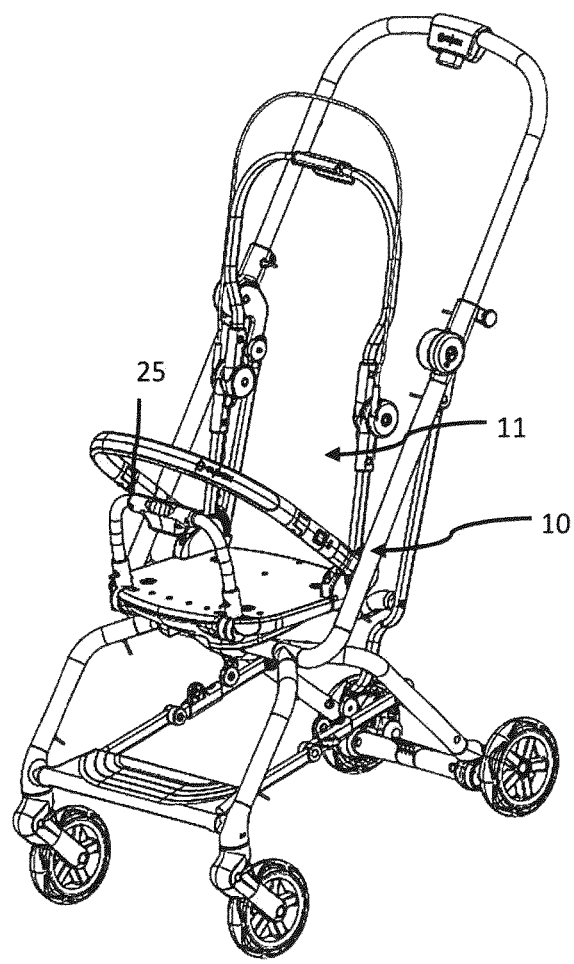
FIG. 14 shows another oblique view of the child seat according to FIG. 1 in a different position.
Figure 16:
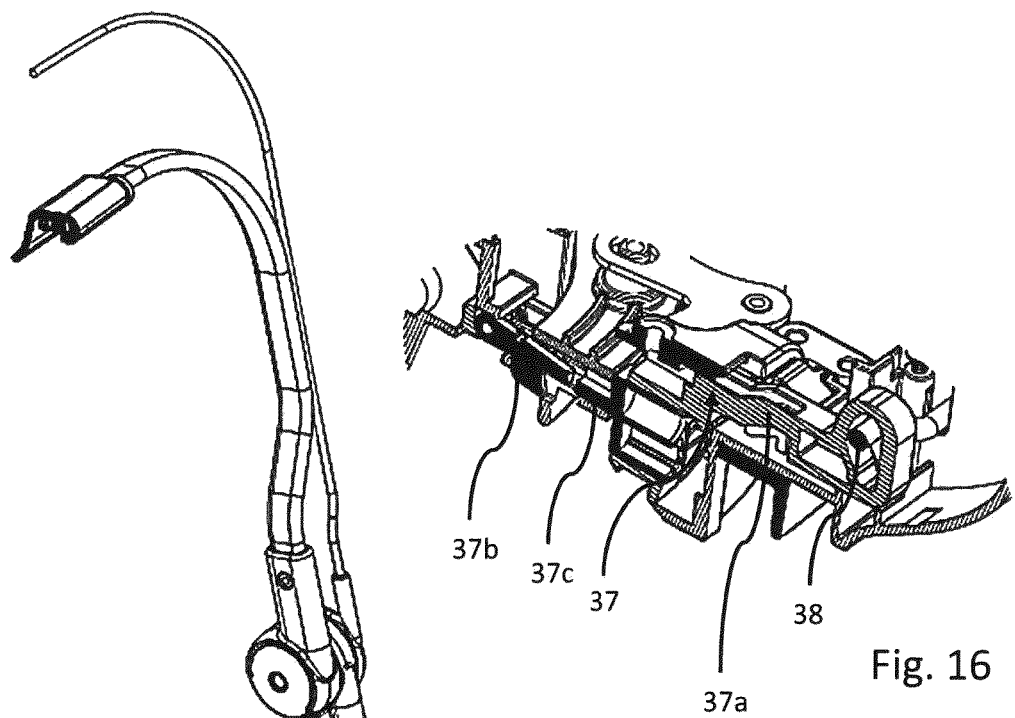
FIG. 16 shows an enlargement of section A of FIG. 15.

FIG. 14 shows the stroller according to the invention as shown in FIG. 1, wherein here the leg section 25 is pivoted upwards and the stroller is in a non-use position.

Figure 15:
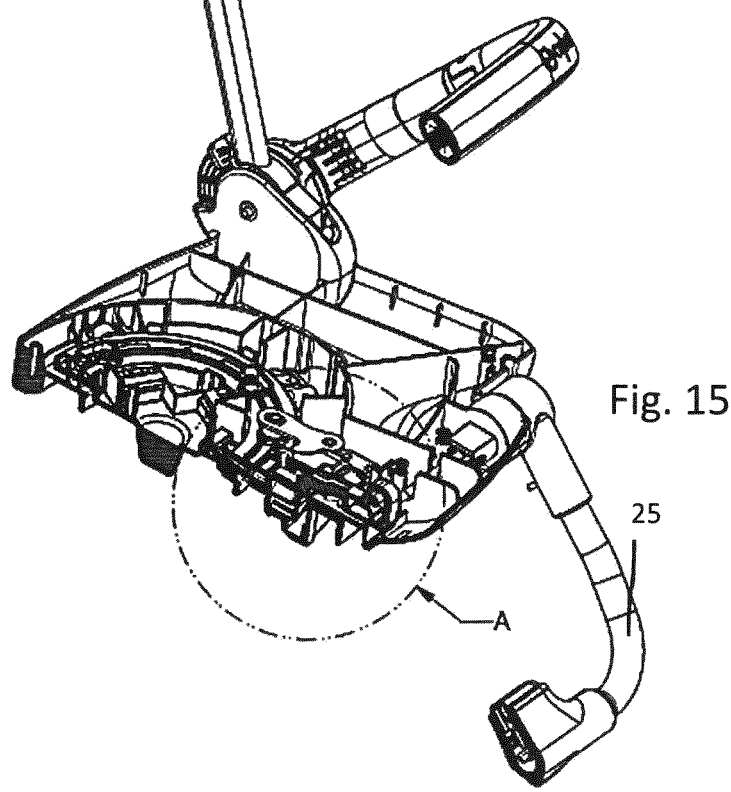
FIG. 15 shows a season of components of a locking mechanism for locking a rotational position.
Figure 19:
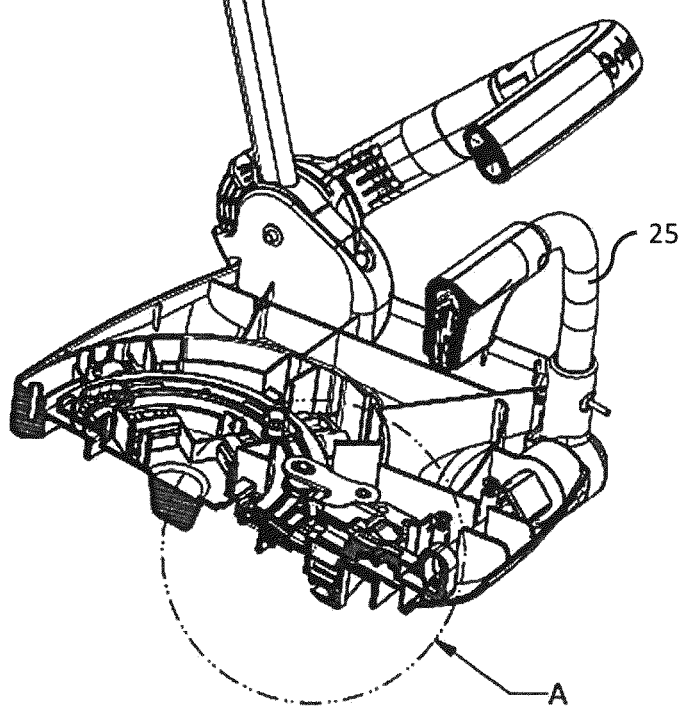
FIG. 19 shows an illustration analogous to FIG. 15 in a different position of the locking mechanism.
Figure 20:
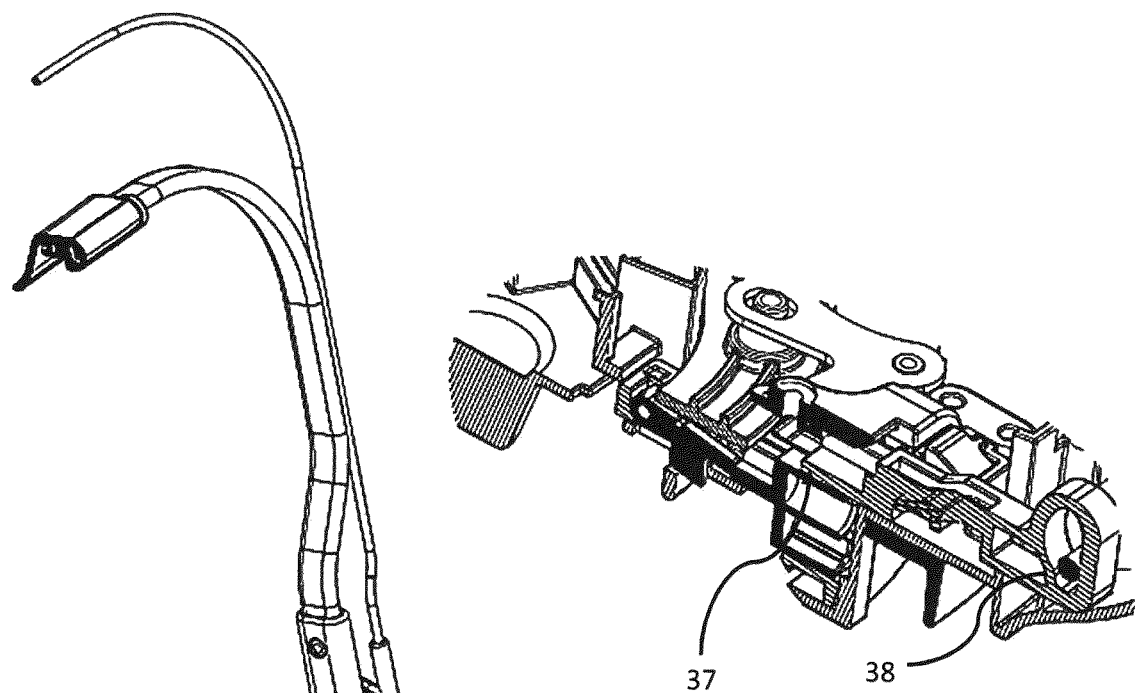
FIG. 20 shows an enlargement of section A of FIG. 19.
Figure 22:
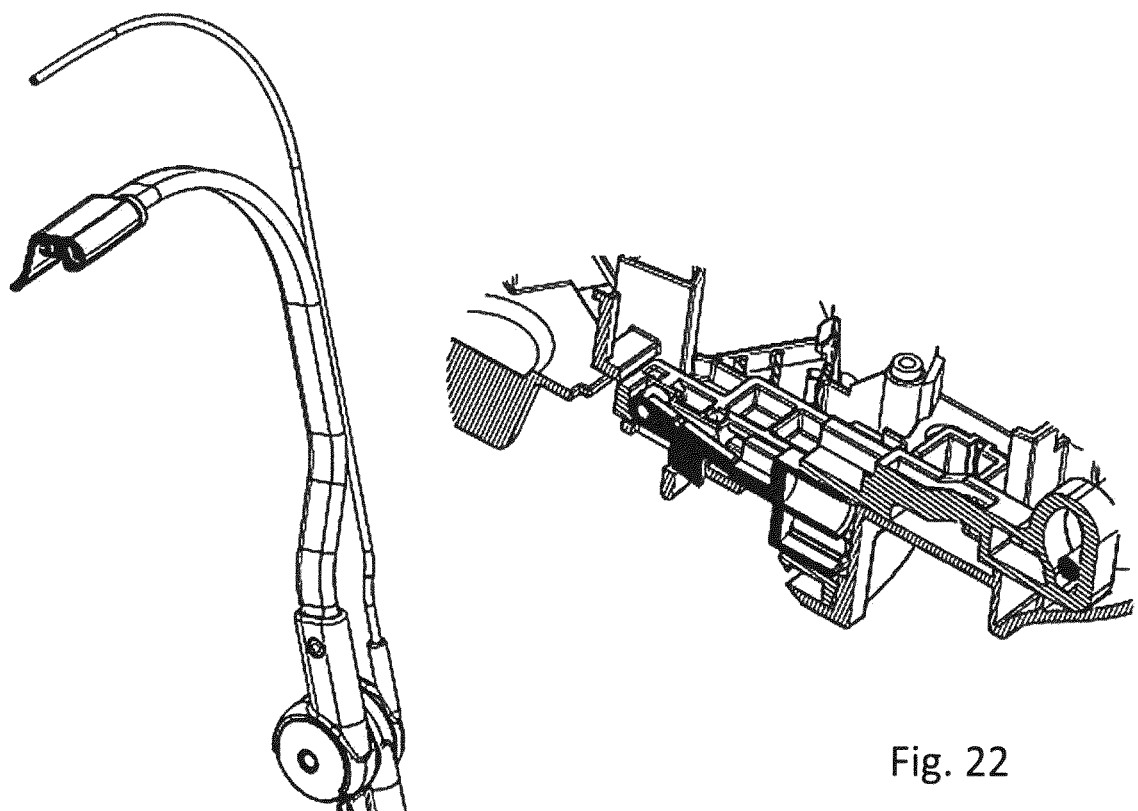
FIG. 22 shows an enlargement of section A or FIG. 21.
Figure 21:
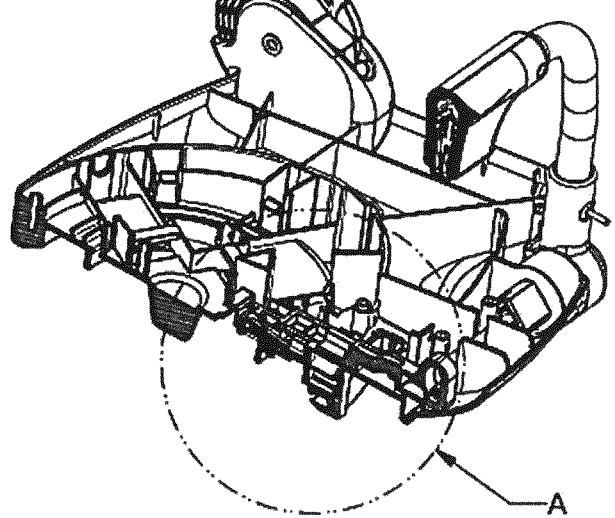
FIG. 21 shows an illustration analogous to FIG. 17 in a different position of the locking mechanism.

FIGS. 15 to 22 illustrate a corresponding optional mechanism for the coupling device 36 or for locking a rotational position of the child receiving device 11 relative to the stroller chassis 10. Specifically, FIGS. 15 and 17 show the leg section 25 (here in a downwardly pivoted position). In this position, rotation (change of orientation) of the child receiving device 13 relative to the stroller chassis 10 is not possible. If the leg section 25 is now transferred to the position shown in FIG. 21 as well as 23, such rotation is possible. For this purpose, a locking device 37 is provided (see FIG. 16), which can be transferred from a locking position (as in FIGS. 16 and 18) to a release position (as in FIGS. 20 and 22), in particular via a radial movement (preferably outward).

This movement is in turn caused by the fact that the leg section 25 comprises a force transmission device 38 (e.g. rod, optionally with a central, cam-like section) or is (possibly firmly) connected to such a device. If the leg section 25 is now pivoted from the position according to FIG. 15 into the position according to FIG. 17, the force transmission device 38 (rod) simultaneously moves radially outward (at least in a component-like manner, wherein a downward movement can be superimposed or, optionally, a pivoting of this force transmission device 38, optionally in particular of the central, cam-like section, is present). The locking device 37 can be driven by this movement.

For locking purposes, the locking device 37 (in the position according to FIGS. 15 to 18) is then in engagement with a corresponding counter structure on the stroller chassis 10. In the embodiment according to FIGS. 19 to 22, this engagement is removed Specifically, the locking device has two interconnected sections 37a, 37b (the interconnection not being fully visible in FIG. 16) and a section 37c (preferably arranged at least in sections between the sections 37a, 37b and/or bifurcated in cross-section) which is movable relative to the sections 37a, 37b. During a movement of the sections 37a, 37b from the position according to FIG. 15 into the position according to FIG. 19, the relatively movable section 37c is moved along only after a partial distance of this movement and then brought into its end position according to FIG. 19. The movable section 37c preferably has the actual locking structure, which can then be brought (in the position according to FIG. 15) into engagement with a corresponding counter structure (not shown in FIGS. 15 to 22, arranged in FIG. 23 at reference sign 43).

Figure 23:
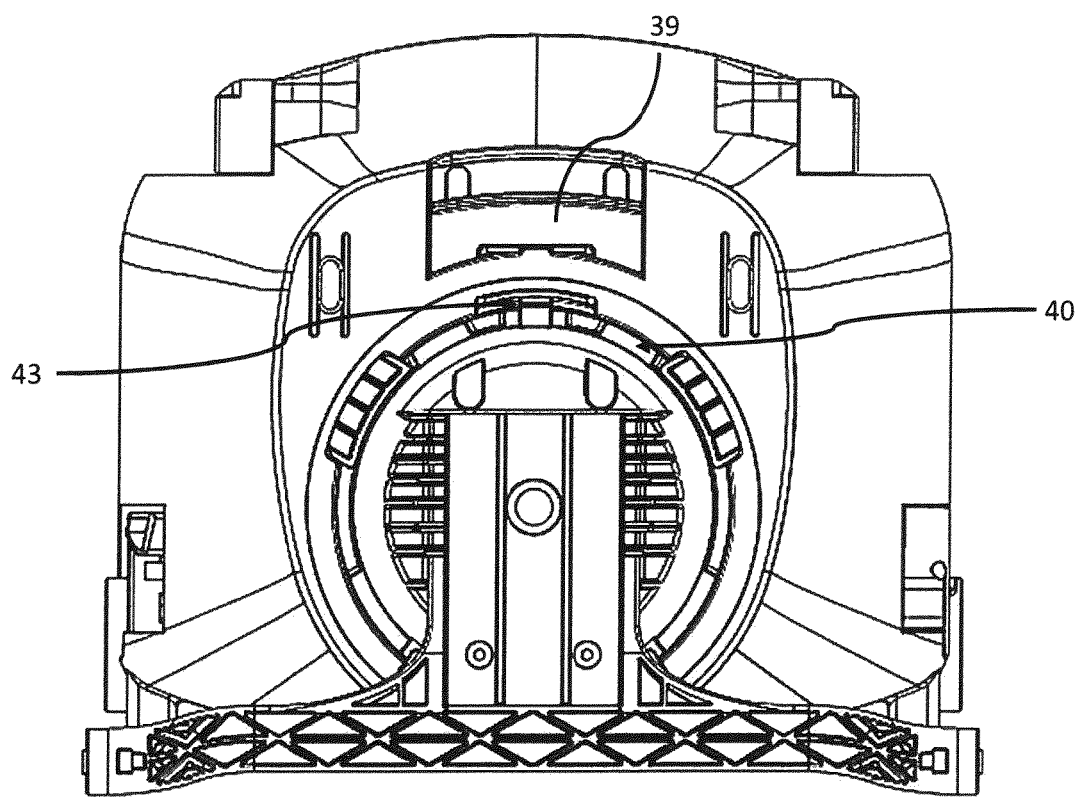
FIG. 23 shows a first view of a release structure for (completely) detaching an attachment from the stroller.
Figure 24:
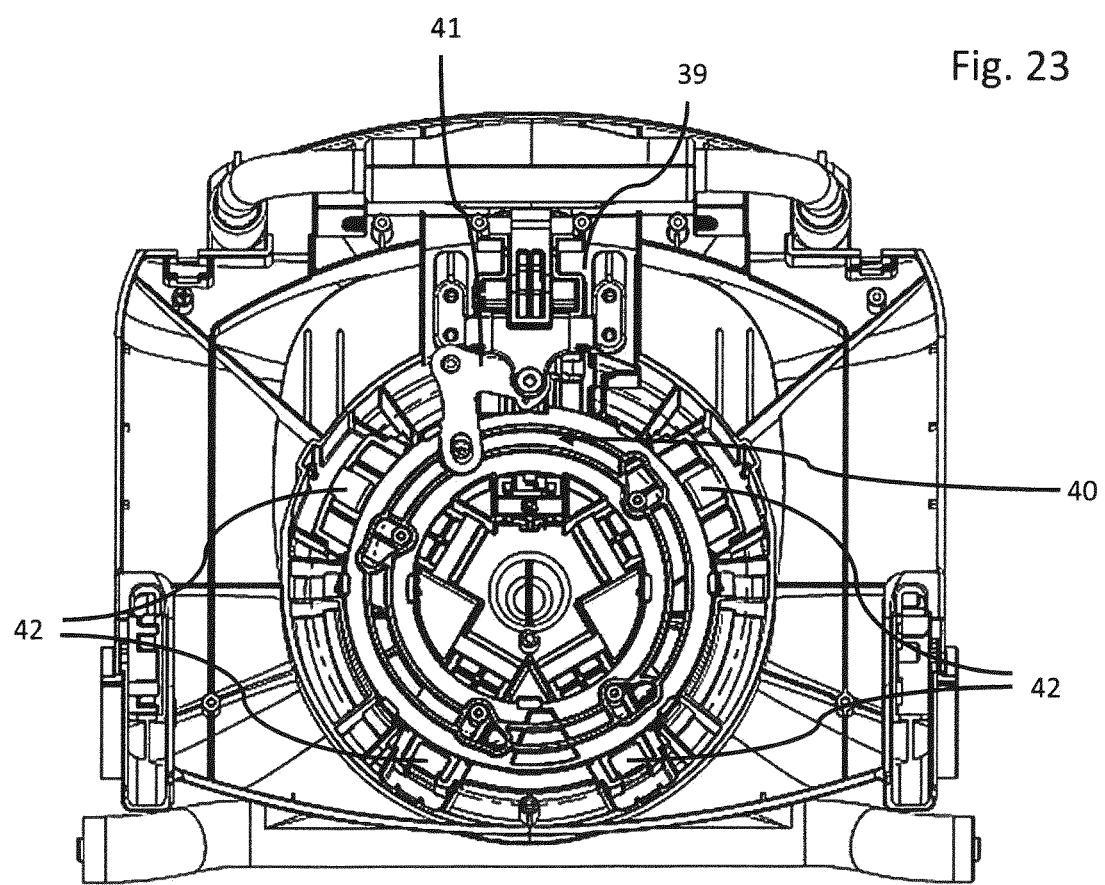
FIG. 24 shows another view of the release mechanism according to FIG. 23.
Figure 25:
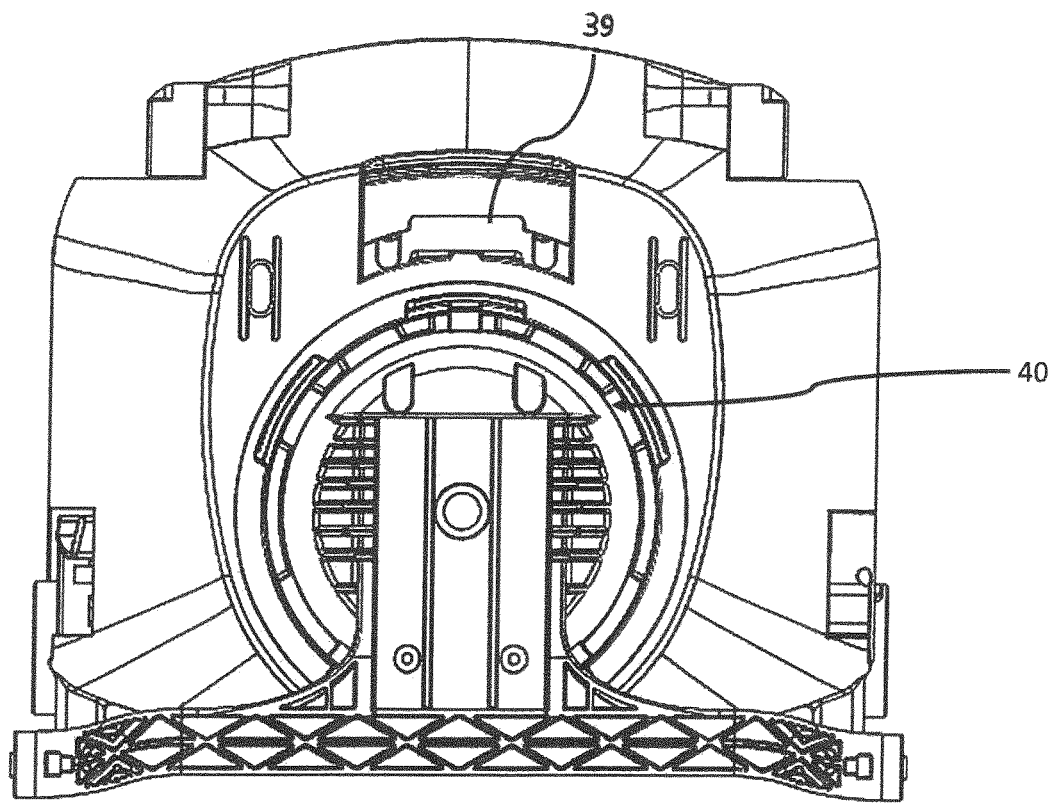
FIG. 25 shows another view of the release mechanism according to FIG. 23 (in a position different from FIG. 23)
Figure 26:
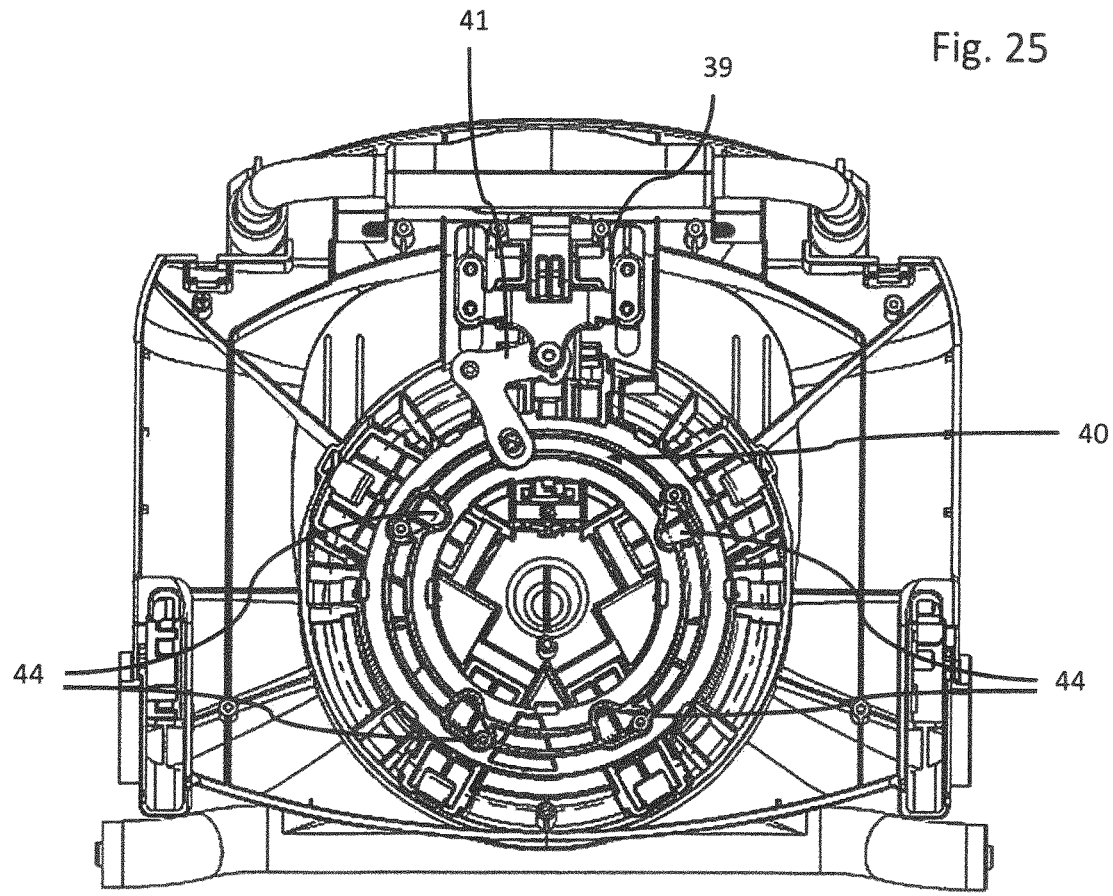
FIG. 26 shows another view of the release mechanism according to FIG. 25 (in a position different from FIG. 24).

In FIGS. 23 to 25, a mechanism is still illustrated chat allows the child receiving device 11 to be completely removed from the stroller chassis 10. Via an actuating device 39 (see FIGS. 23, 24), a ring structure 40 can be rotated (preferably via a first transmission structure 41; e.g., lever or angle; optionally via a second transmission structure 44) so that at least one locking structure 42 (in the embodiments according to FIGS. 23 to 26, four optionally spring-mounted locking structures 42, with a fifth locking structure 42 being covered by the actuating device 39 and almost not visible in the figures; however, the number of locking structures is not mandatory anyway) is either engaged (so that release of the child receiving device 11 is not possible) or disengaged (so that release is possible).

At this point it should be noted that all the parts described above, considered alone and in any combination, in particular the details shown in the drawings, are claimed as further embodiments of the invention.

Modifications thereof are possible.

REFERENCE SIGNS (FOR THE PREVIOUS SECTION)

α Angle between back section and buttocks section
β Angle between buttocks section and leg section
γ Angle between upper back section and lower back section
10 Stroller
11 Child receiving device
12 Slider
13 Upper slider section
14 Lower slide section
15 Joint
16 Rear wheel strut
17 Front wheel strut
18 Rear wheel
19 Front wheel
20 Fastening device
21 Locking device
22 Locking device
23 Sack section
24 Buttocks section
25 Leg section
26 Upper back section
27 Lower back section
28 Joint
29 Joint
30 Joint
31 Locking structure
32 Locking structure
33 Circle
34 Joint
35 Joint
36 Coupling device
37 Locking device
37a-37c Section
38 Transmission device
39 Actuating device 21
40 Ring structure
41 First transmission structure
42 Locking structure
43 Counter structure
44 Second transmission structure In the following, me invention is abstractly defined by means of further aspects (numbered from 1. to 10.) (wherein generalizations according to the invention, deviations and additions to the claims and/or the above description are also included). The following aspects are further explained and generalized, as appropriate, with still further embodiments of the invention. The following—in particular each of the aspects presented below, even Without reference back to an aspect with a smaller Arabic numeral—can be combined particularly preferably with the preceding embodiment of the invention and/or the appended claims.

1. Direction changing mechanism (preferably as past of the above and/or the stroller explained in the claims) for children's articles (preferably a stroller), characterized in that the aforementioned children's article comprises a fixed body (with respect to an external reference point, such as a standing surface, or at least relative to the following rotating body) and a rotating body rotatably connected to the fixed body (at least relative to the fixed body), wherein the aforesaid rotating body has at least one (in particular fixed) first orientation with respect to the aforesaid fixed body in its direction of rotation and a second orientation, wherein the aforesaid direction changing mechanism comprises a locking part for locking between the aforesaid fixed body and the aforesaid rotating body, and comprises a first drive mechanism which is used for entraining the aforesaid locking part to move and lock between the aforesaid fixed body and the aforesaid rotating body, and a second drive mechanism for entraining the aforesaid locking part to move and unlock between the aforesaid fixed body and the rotating body, wherein said second drive mechanism comprises an actuating part for actuation by persons and a transmission component connected to said actuating part and entraining said locking part for movement, wherein said actuating part has a first use position and a second use position with respect to said rotating body, wherein upon actuation of the aforesaid actuating part with movement relative to the rotating body to the first use position, the aforesaid transmission component entrains aforesaid locking part for movement and can effect unlocking between the aforesaid fixed body and the rotating body, wherein, when the aforesaid actuating part continues to remain in the first position of use and causes the aforesaid rotating body to rotate into the first orientation or the second orientation, the aforesaid first drive mechanism entrains the aforesaid locking part for movement and locking occurs between the aforesaid fixed body and the rotating body.

2. Direction changing mechanism for children's articles according to 1, characterized in that the aforesaid locking part is slidably provided on the aforesaid rotating body, wherein a clamping groove suitable for clamping connection with the aforesaid locking part is provided on the aforesaid fixed body, wherein when the aforesaid locking part is slid and clamped in the aforesaid clamping groove, locking occurs between the aforesaid fixed body and the aforesaid rotating body.

3. Direction changing mechanism for children's articles according to 1. or 2., characterized in that the aforesaid transmission component comprises a slide mount slidably provided on the aforesaid rotating body and a ratchet tooth provided at one end of the aforesaid slide mount, while the other end of the aforesaid slide mount is connected to the aforesaid actuating part, wherein the aforesaid ratchet tooth is capable of entraining the aforesaid locking part for movement upon leaving the aforesaid clamping groove.

4. Direction changing mechanism for children's articles according to one of 1. to 3., characterized in that the aforesaid ratchet tooth is located at the front of the direction of movement upon sliding of the aforesaid locking part into the aforesaid clamping groove, wherein, when the aforesaid transmission component entrains the aforesaid locking part for movement and unlocking, one end of the aforesaid ratchet tooth abuts against the aforesaid locking part, pushing it and thus unlocking the aforesaid locking part for leaving the clamping groove designated above.

5. Direction changing mechanism for children's articles according to one of 1. to 4., characterized In that the rotational connection of the aforesaid ratchet tooth is provided on the aforesaid slide mount, wherein the aforesaid ratchet tooth has on its rotational track a first state and a second state located above the first state, wherein when the aforesaid ratchet tooth is in the first state the aforesaid ratchet tooth can push the aforesaid locking part to leave the clamping groove, while when the aforesaid ratchet tooth is in the second state, the aforesaid ratchet tooth cannot exert a push on the aforesaid locking part in the sliding direction of the aforesaid locking part.

6. Direction changing mechanism for children's articles according to one of 1. to 5., characterized in that aforesaid direction changing mechanism further comprises a torsion spring adapted to entrain aforesaid ratchet tooth for movement to the first state, and an entrainment structure adapted to entrain the aforesaid ratchet tooth for movement to the second state.

7. Direction changing mechanism for children's articles according to one of 1. to 6., characterized in that the aforesaid ratchet tooth has a contact part adapted to contact the aforesaid locking part and a guide part provided connected below the aforesaid contact part, wherein the aforesaid entrainment structure comprises a guide groove provided on the aforesaid fixed body, wherein the aforesaid guide part is located within the aforesaid guide groove when the ratchet tooth is in the first state, wherein upon rotation of the aforesaid rotating body and co-rotation of the aforesaid ratchet tooth, the aforesaid ratchet rotates upwardly to the second state via the guiding action of the aforesaid guide part and the inclined surface of the aforesaid guide groove.

8. Direction changing mechanism for children's articles according to one of 1-7, characterized in that the aforesaid children's article is a stroller or a children's chair, wherein the aforesaid fixed body is a fixed plate provided on the stroller chassis or the children's chair frame, while the aforesaid rotating body is a seat provided on the aforesaid fixed plate, wherein the aforesaid direction changing mechanism is provided between the aforesaid fixed plate and the aforesaid seat.

9. Direction changing mechanism for children's articles according to one of 1. to 8., characterized in that aforesaid actuating part is a step bar rotatably connected to aforesaid seat, wherein when aforesaid step bar is rotated to the first position of use, aforesaid step bar is located above the plane of the seat surface of aforesaid seat, whereas when aforesaid step bar is rotated to the second position of use, aforesaid step bar is located below the plane of the seat surface of aforesaid seat.

10. Direction changing mechanism for children's articles according to one of 1. to 9., characterized in that a rotary shaft is fixedly connected between the two ends of the aforesaid actuating part, wherein the aforesaid rotary shaft is rotatably provided on the aforesaid rotating body, wherein a curved transmission part is provided at the central part of the aforesaid rotary shaft, wherein a transmission opening is provided at the aforesaid slide mount, wherein the aforesaid curved transmission part is provided inside the aforesaid transmission opening.

Thus, the present invention (also) relates to a direction changing mechanism for children's articles, wherein the children's article comprises a fixed body and a rotating body rotatably connected to the fixed body, wherein the rotating body has at least a fixed first orientation and a second orientation with respect to the fixed body in its direction of rotation, wherein the direction changing mechanism comprises a locking part for locking between the fixed body and the rotating body, and a first drive mechanism for entraining the locking part for movement and locking between the fixed body and the rotating body, and a second drive mechanism for entraining the locking part for movement and for unlocking between the fixed body and the rotating body, wherein the second drive mechanism comprises an actuating part for actuation by persons and a transmission component, wherein the actuation part has a first use position and a second use position with respect to the rotating body, wherein the direction changing mechanism is designed as a compact and adequate construction by a refined constructive conception, wherein a sufficient application to the step bar causes it to be used as a step bar for unlocking, wherein after the realization of the change of direction of the seat, the locking takes place, wherein for the locking no manual operation is required and thus operation and use are extremely convenient.

CONTENT OF THE INVENTION

To solve the problem(s) in the prior art, the present invention provides a direction changing mechanism for children's articles with the following technical concept.

A direction changing mechanism for a children's article, wherein the children's article comprises a fixed body and a rotating body rotatably connected to the fixed body, wherein the rotating body has at least a fixed first orientation and a second orientation with respect to the fixed body in its direction of rotation, wherein the direction changing mechanism has a locking part for locking between the fixed body and the rotating body and a first drive mechanism for entraining the locking part for movement and for locking between the fixed body and the rotating body, and a second drive mechanism for entraining the locking part for movement and for unlocking between the fixed body and the rotating body, wherein die second drive mechanism comprises an actuating part for actuation by persons and a transmission component connected to the actuating part and entraining the locking part for movement, wherein the actuating part has a first use position and a second use position with respect to the rotating body, wherein upon actuation of the actuating part with movement relative to the rotating body to the first use position, the transmission component entrains the locking part for movement and can effect unlocking between the fixed body and the rotating body, wherein, when the actuating part continues to remain in the first use position and causes the rotating body to rotate to the first orientation or the second orientation, the first drive mechanism is operable to entrain the locking part for movement and locking occurs between the fixed body and the rotating body.

Strollers are popular vehicles for children for walks and essential for parents when taking the children shopping. It is advantageous if the stroller has a function of changing direction for a better user experience. It is conceivable to effect the change of orientation of the stroller by changing the direction of the push rod, or to realize the change of orientation by rotating the seat on the stroller chassis. In the case of a stroller with change of orientation by rotation of the seat on the stroller chassis, corresponding rotating structures may have different designs, however, when changing the orientation of the seat after unlocking the seat and switching to the other orientation, manual operation may be required to lock the seat in the respective orientation, which is inconvenient.

It is preferably provided that the locking part is provided slidingly on the rotating body, wherein a clamping groove suitable for clamping connection with the locking part is provided on the fixed body, wherein upon sliding and clamping of the locking part in the clamping groove, locking occurs between the fixed body and the rotating body.

It is preferably provided that the transmission component comprises a slide mount slidably provided on the rotating body and a ratchet tooth provided at one end of the slide mount, while the other end of the slide mount is connected to the actuating part, wherein the ratchet tooth is capable of entraining the locking part for movement upon leaving the clamping groove.

It is preferably provided that the ratchet tooth is provided at the front of the direction of movement upon sliding of the locking part into the clamping groove, wherein, when the transmission component entrains the locking part for movement and unlocking, one end of the ratchet tooth abuts against the locking part, pushing it and thus causing the locking part to leave the aforementioned clamping groove.

It is preferably provided that the rotational connection of the ratchet tooth is provided at the slide mount, wherein the ratchet tooth has a first state on its rotational track and a second state located above the first state, wherein, when the ratchet tooth is in the first state, the ratchet tooth can push the locking part to leave the clamping groove, while when the ratchet tooth is in the second state, the ratchet tooth cannot exert a push on the locking part in the sliding direction of the locking part.

It is preferably provided that the direction change mechanism further comprises a torsion spring adapted to entrain the ratchet tooth for movement to the first state and an entrapment structure adapted to entrain the ratchet tooth for movement to the second state.

It is preferably provided that the ratchet tooth has a contact part adapted to contact the locking part and a guide part provided connected below the contact part, wherein the entrainment structure comprises a guide groove provided on the fixed body, wherein the guide part is located inside the guide groove when the ratchet tooth is in the first state, wherein upon rotation of the rotating body and co-rotation of the ratchet tooth via the guiding action of the guide part and the inclined surface of the guide groove, the ratchet tooth rotates upwards into the second state.

It is preferably provided that the children's article is a stroller or a child's chair, wherein the fixed body is a fixed plate provided on the stroller chassis or the child's chair frame, while the rotating body is a seat provided on the fixed plate, wherein the direction changing mechanism is provided between the fixed plate and the seat.

It is preferably provided that the actuating part is a step bar rotatably connected to the seat, wherein when the step bar is rotated to the first position of use, the step bar is located above the plane of the seat surface of the seat, while when the step bar is rotated to the second position of use, the step bar is located below the plane of the seat surface of the seat.

It is preferably provided that between the two ends of the actuating part a rotary shaft is fixedly connected, wherein the rotary shaft is rotatably provided on the rotating body, wherein on the central part of the rotary shaft a curved transmission part is provided, wherein on the slide mount a transmission opening is provided, wherein the curved transmission part is provided inside the transmission opening.

By applying the described conception of the present invention, the present invention has the following advantages over the prior art:

When the present invention is applied to a stroller, the direction changing mechanism is used to control the interlock between the fixed plate (fixed body) and the seat (rotating body). When the step bar is pushed to the first use position, the locking part can release the interlock between the fixed plate and the seat, wherein without a required resetting of the step bar to the original position (second use position) after the seat is changed to the required orientation, the automatic locking is performed (the first drive mechanism pushes the locking part to lock). The direction changing mechanism in question is designed as a compact and appropriate construction by a refined constructive conception, wherein a sufficient application to the step bar causes it to be used as a step bar for unlocking, wherein after the realization of the change of direction of the seat the locking takes place, wherein no manual operation is required for the locking, and thus operation and use are extremely convenient. Explanation of further figures (also called illustrations) 27 to 35.

Figure 27:
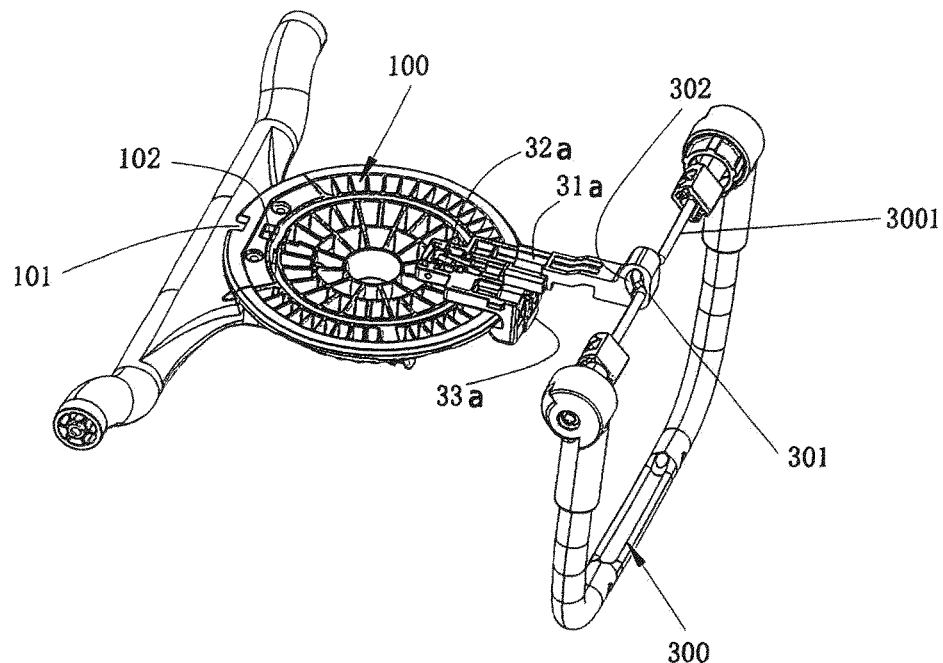

FIG. 27 is a three-dimensional representation of the fixed plate and direction change mechanism of the present invention (the step bar is in the second use position).

Figure 28:
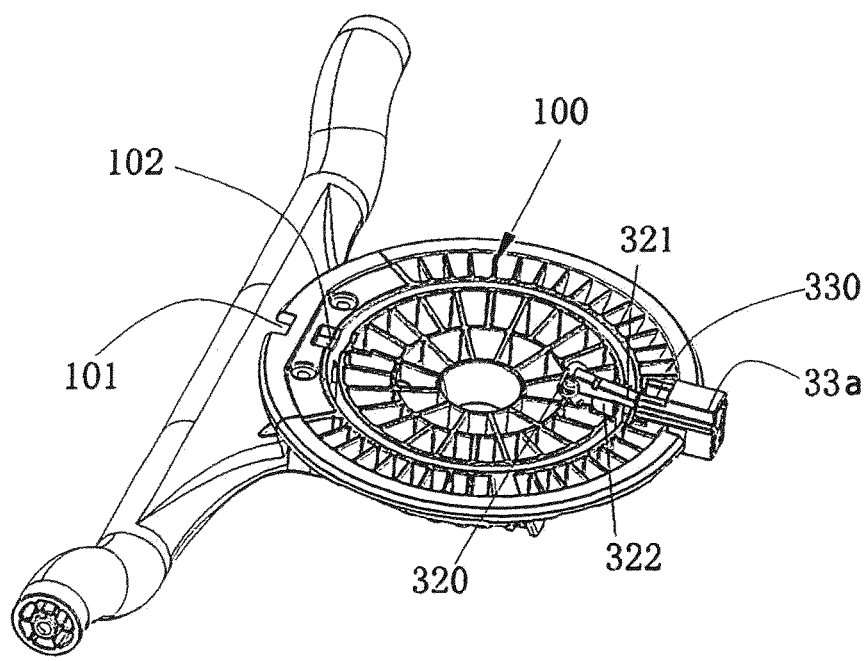

FIG. 28 is a three-dimensional representation of the fixed plate, locking part and ratchet tooth of the present invention (clamping connection between locking part and clamping groove and ratchet tooth in the first state).

Figure 29:
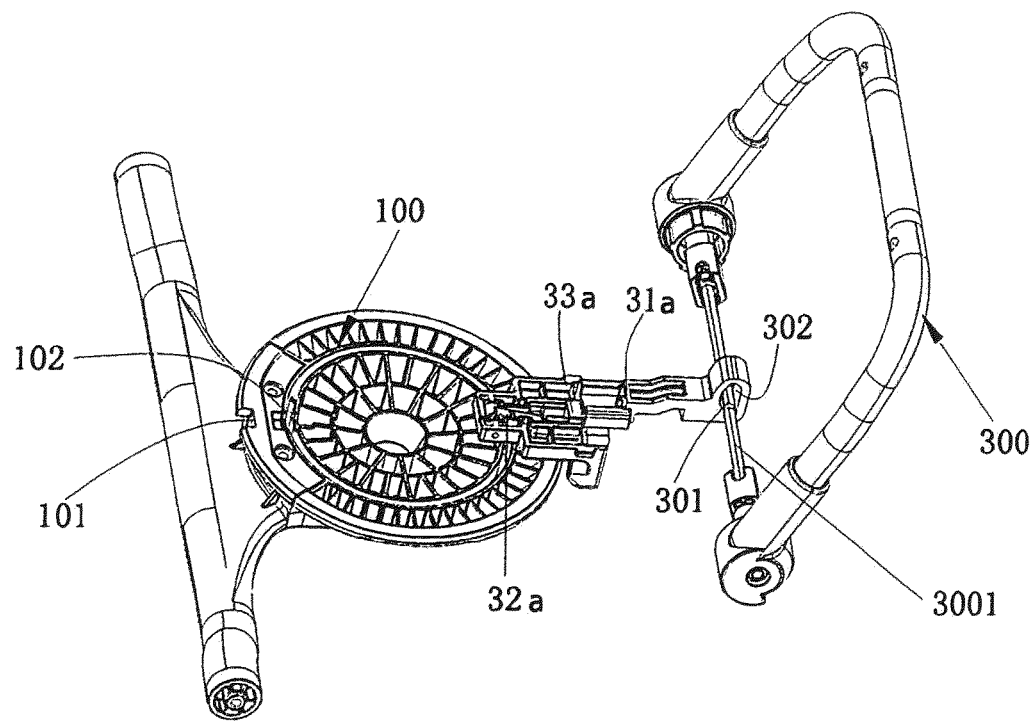

FIG. 29 is a three-dimensional representation of the fixed plate and direction change mechanism of the present invention (the step bar is in the first use position).

Figure 30:
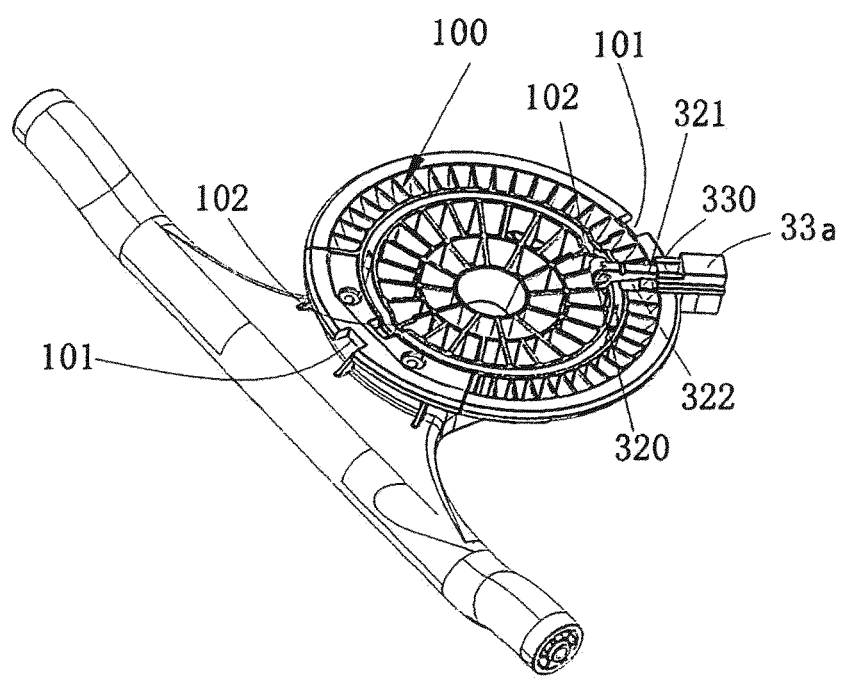

FIG. 30 is a three-dimensional representation of the fixed plate, locking part and ratchet tooth of the present invention (release of the damping connection between the locking part and the clamping groove, ratchet tooth in the second state and rotation of the seat about a certain angle).

Figure 31:
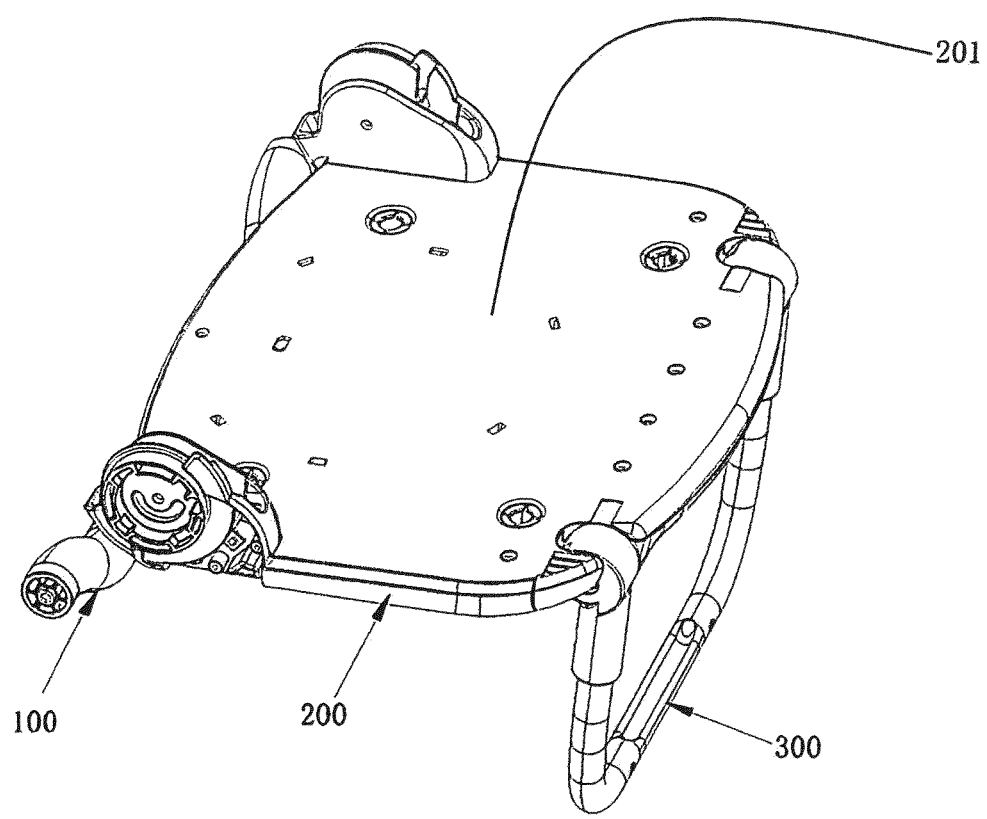

FIG. 31 is a three-dimensional representation of the fixed plate, seat and step bar of the present invention.

Figure 32:
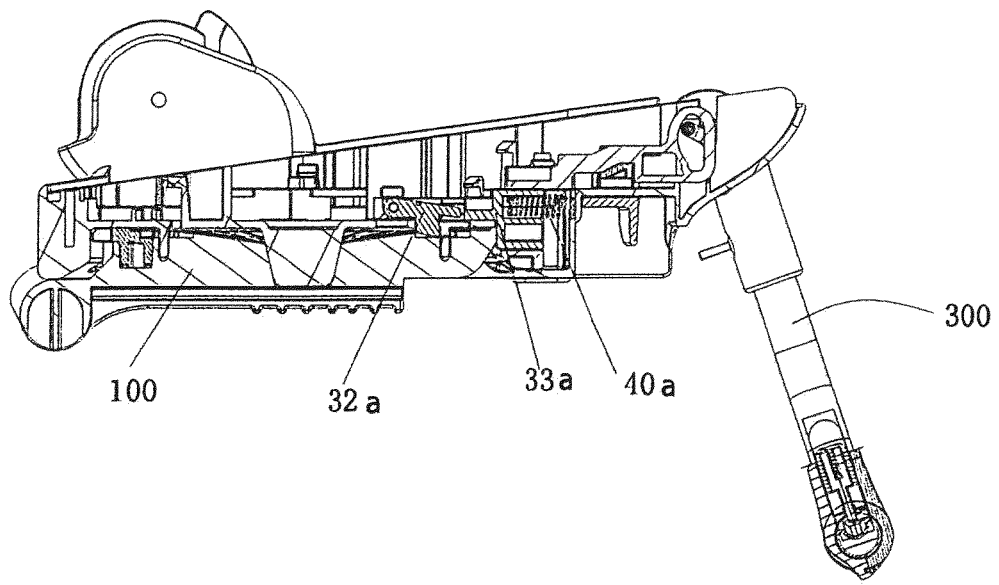
Figure 33:
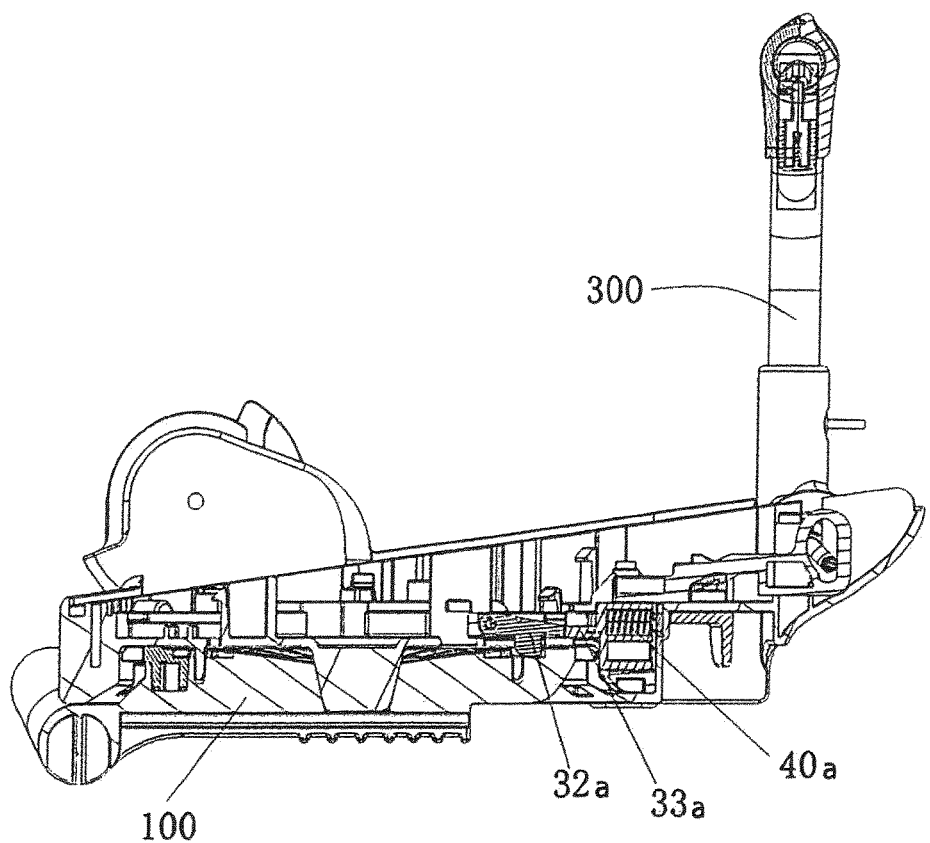

FIG. 32 is a side sectional view of the children's article of the present invention in normal use FIG. 33 is a side sectional view of the children's article of the present invention in preparation for the change of direction (unlocking of the locking part).

Figure 34:
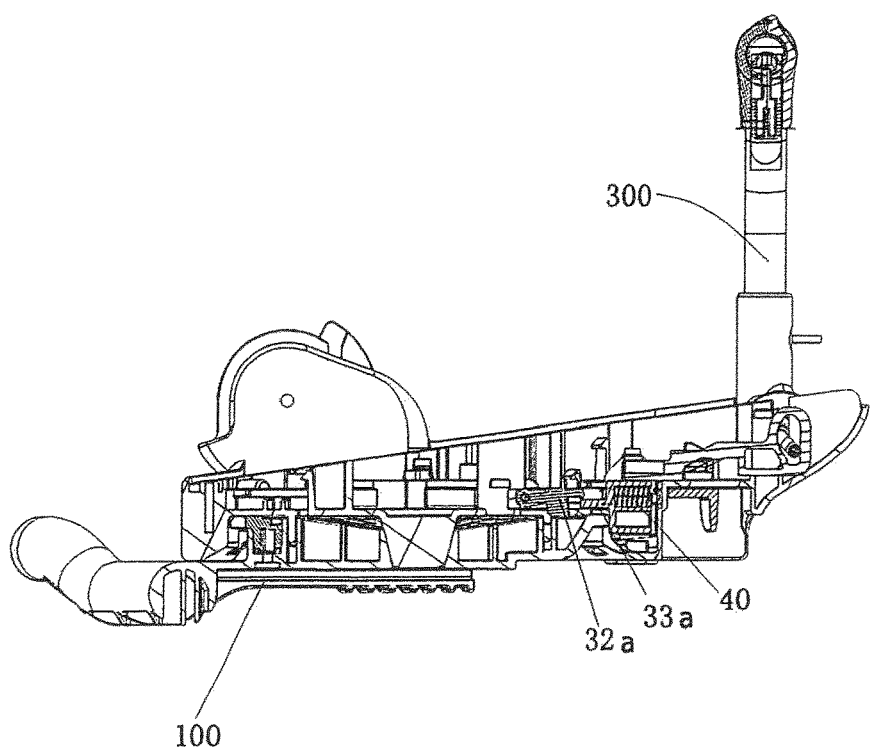

FIG. 34 is a side sectional view of the children's article of the present invention during the change of direction (raised ratchet tooth).

Figure 35:
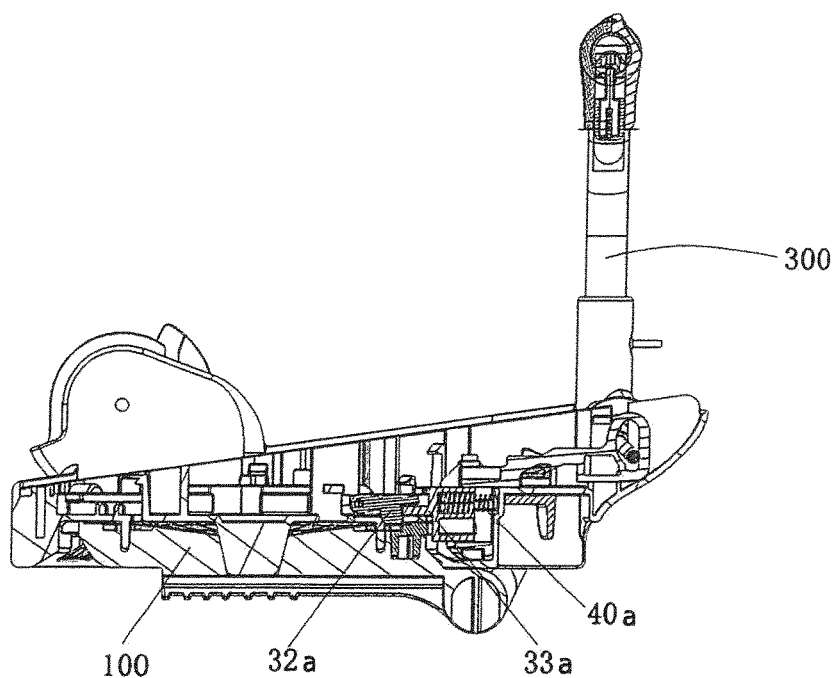

FIG. 35 is a side sectional view of the children's article of the present invention after changing direction (relocking the locking part).

Reference numerals (For the further FIGS. 27 to 35): 100 fixed plate, 101 clamping groove, 102 guide groove, 200 seat, 201 seat surface, 300 step bar, 3001 pivot shaft, 301 curved transmission part, 302 transmission opening, 31*a* slide mount, 32*a* ratchet tooth, 320 torsion spring, 321 contact part, 322 guide part, 33*a* locking part, 330 obstruction groove, 40*a* spring.

EMBODIMENTS

Set forth below is a further detailed description of the present invention by reference to the accompanying figures and by reference to embodiments. As shown in FIGS. 27-35, the direction changing mechanism is for a children's article, wherein the children's article comprises a fixed body and a rotating body rotatably connected to the fixed body, wherein the children's article is a stroller, wherein the fixed body is a fixed plate 100 attached to the stroller chassis while the rotating body is a seat 200 connected to the fixed plate 100, wherein the seat 200 has at least a fixed first orientation (forward facing direction of the child) and a second orientation (rearward facing direction of the child) with respect to the fixed plate 100 in its direction of rotation, wherein the direction changing mechanism is capable of releasing the lock between the fixed plate 100 and the seat 200 or realizing the lock between the seat 200 and the fixed plate 100 after rotation of the seat 200 to the required orientation.

The direction changing mechanism comprises a locking part 33a for locking between the fixed plate 100 and the seat 200, a first drive mechanism for entraining the locking part 33a for sliding movement and for locking between the fixed plate 100 and the seat 200, and a second drive mechanism for entraining the locking part 33a for sliding movement and for unlocking between the fixed plate 100 and the seat 200, wherein a clamping groove 101 suitable for clamping connection with the locking part 33a is provided on the fixed plate 100, wherein, when the locking part 33a slides and is clamped in the clamping groove 101, the locking between the fixed plate 100 and the seat 200 takes place.

Specifically, it is provided that the first drive mechanism comprises a spring 40a provided within the housing of the seat 200, wherein the spring 40a realizes the automatic locking function of the locking part 33a by pushing force, the spring 40a abutting the side surface of the locking part 33a remote from the clamping groove 101, which is not shown in the figure The second drive mechanism comprises an actuating part for actuation by persons, and a transmission component connected to the actuating part and entraining the locking part for movement. The respective actuating part is a step bar 300 rotatably connected to the seat 200, wherein a pivot shaft 3001 is fixedly connected between the two ends of the step bar 300, wherein the pivot shaft 3001 is rotatably provided on the slide mount 31a of the seat 200, wherein a curved transmission component 301 is provided at the central part of the pivot shaft 3001, wherein the respective transmission component comprises a slide mount 31a slidably provided on the seat 200 and a ratchet tooth 32a provided at one end of the slide mount 31a, wherein the ratchet tooth 32a is located at the front of the moving direction upon sliding of the locking part 33a into the clamping groove 101, wherein the transmission opening 302 is formed at the end of the slide mount 31a connected to the step bar 300, wherein the curved transmission part 301 is provided inside the transmission opening 302.

In the present embodiment, it is provided that the step bar 300 has a first use position located above the plane of the seat surface 201 of the seat 200 and a second use position located below the plane of the seat surface 201 of the seat 200 in the direction rotating around the pivot shaft 3001. When the step bar 300 is operated to move to the first use position located above the plane of the seat surface 201, the pivot shaft 3001 rotates, and the coordination between the curved transmission part 301 located thereon and the transmission opening 302 causes the sliding forward movement of the slide mount 31a, wherein the ratchet tooth 32a is entrained for the forward movement, and the ratchet tooth 32a abuts and pushes the locking part 33a from one side so as to cause the locking part 33a to leave the clamping groove 101. When the step bar 300 is operated to move to the second position of use located below the seat surface 201, the sequence is reversed and ultimately the ratchet tooth 32a is entrained to move backward and returns to the original position, wherein the next upward rotation of the step bar 300 causes the locking part 3a3 to be entrained again with unlocking.

It is further provided that the rotational connection of the ratchet tooth 32a is provided at the slide mount 31a, wherein the ratchet tooth 32a has on its rotational track a first state and a second state located above the first state, wherein the direction changing mechanism further comprises a torsion spring 320 serving to entrain the ratchet tooth 32a to move to the first state and an entrapment structure serving to entrain the ratchet tooth 32a to move to the second state. Specifically, it is provided that the ratchet tooth 32a has a contact part 321 adapted to contact with the locking part 33a and a guide part 322 provided connected below the contact part 321, wherein the entrapment structure comprises a guide groove 102 provided on the fixed plate 100, wherein the guide groove 102 is on the same radius as the damping groove 101, wherein an inclined surface is formed at both ends of the guide groove 102 to lift the guide part 322 of the ratchet tooth 32a.

With the ratchet tooth 32a in the first state, the lower side of the guide part 322 abuts the groove bottom of the guide groove 102. Now the contact part 321 of the ratchet tooth 32a has a relatively low position, can push the locking part 33a and cause it to leave the damping groove 101.

When the seat 200 is rotated and the ratchet tooth 32a is rotated along with it, the ratchet tooth 32a rotates upward to the second state via the guiding action of the guide part 322 and the inclined surface of the guide groove 102. When the ratchet tooth 32a is in the second state, the position of the contact part 321 of the ratchet tooth 32a is slightly higher with respect to the first state, and there is an accurate matching with the obstruction groove 330 provided on the locking part 33a (an obstruction groove is provided on the locking part for obstructing the contact part of the ratchet tooth), wherein entry into the obstruction groove 330 takes place, meaning that the ratchet tooth 32a now experiences no hindrance in the sliding direction of the locking part 33a, wherein after the rotation of the seat 200 is completed and the locking part 33a is pushed into the clamping groove 101 by the spring 40a, the contact part 321 of the ratchet tooth 32a further enters the groove 330 and no hindrance of the locking part 33a occurs. Thus, the automatic clamping connection between the locking part 33a and the damping groove 101 takes place and the locking between the fixed plate 100 and the seat 200 is effected.

The rotation of the seat 200 for locking and unlocking is as follows:

The side with the step Par 300 is defined as the front of the seat 200 and the opposite side as the rear of the seat 200.

As shown in FIGS. 31-33, the actuation of the step bar 300 is first performed so that the step bar 300 is rotated from the second use position to the first use position from the bottom to the top. When the step oar 300 is rotated, the coordination between the curved transmission part 301 located at the pivot shaft 3001 and the transmission opening 302 provided at the slide mount 31a is performed to cause the sliding forward movement of the slide mount 31a. The sliding movement of the slide mount 31a entrains the ratchet tooth 32 rotationally connected to the same for forward movement, and the ratchet tooth 32a is in the first state under the action of the torsional force of the torsion spring 320, wherein its contact part 321 abuts against the locking part 33a, thus entraining the locking part 33a for forward movement upon leaving the clamping groove 101. Now, the seat 200 can be rotated on the fixed plate 100 and by pulling the step bar 300, the seat 200 is rotated. When the seat 200 is rotated to the first orientation or the second orientation, the locking part 33a enters the other clamping groove 101 under the action of the spring 40a. The contact part 321 of the ratchet tooth 32a enters the obstruction groove 330, and now the seat 200 can be locked to the fixed plate 100. Simultaneously with the rotation of the seat 200, the guide part 322 of the ratchet tooth 32 moves upward along the groove bottom of the guide groove 102 and after rotation of the seat 200 by 3-5°, the ratchet tooth 32a can be rotated upward to the second state. Now, there is coordination between the contact part 321 of the ratchet tooth 32a and the obstruction groove 330 located above the locking part 33a. Thus, entrance can be made to the obstruction groove 330 and no thrust force is applied to the locking part 33a. When the seat 200 is moved to the first or the second orientation and the locking part 33a is pushed into the damping groove 101 by the spring 40a, the contact part 321 of the ratchet tooth 32a is pushed further into the obstruction groove 330 and there is no longer any obstruction of the locking part 33a. Thus, the locking part 33a can enter the obstruction groove 101 without obstruction, and locking between the fixed plate 100 and the seat 200 is performed until automatic locking is performed after the seat 200 is rotated. Then, the step bar 300 is returned to the second use position and is used to place the child's feet, when the step bar 300 is moved downward, the curved transmission part 301 located at the pivot shaft 3001 is aligned with the transmission opening 302 located at the slide mount 31a so that the slide mount 31a is moved backward, as well as the ratchet tooth 32a is entrained to move backward. When the ratchet tooth 32a moves until the contact part 321 leaves the obstruction groove 330, the ratchet tooth 32a is returned to the first state under the action of the torsion spring 320, and now the lower surface of the guide part 322 of the ratchet, tooth 32a has contact with the groove bottom of the other guide groove 102. This signifies the completion of an actuation sequence. The next time it is necessary to change the orientation of the seat 200, the sequence described here is repeated.

In summary, in the case of a stroller as a children's article according to the present invention, the direction changing mechanism is for controlling the interlock between the fixed plate (fixed body) and the seat (rotating body). When the step bar is pushed to the first use position, the locking part can release the lock between the fixed plate and the seat, wherein without a required resetting of the step bar to the original position (second use position) after the seat is changed to the required orientation, the automatic locking is performed (the first drive mechanism pushes the locking part to lock). The direction changing mechanism in question is designed as a compact and appropriate construction by a refined constructive conception, wherein a sufficient application to the step bar causes it to be used as a step bar for unlocking, wherein after the realization of the change of direction of the seat the locking takes place, wherein no manual operation is required for the locking, and thus operation and use are extremely convenient.

Because no downward rotation of the step bar is required to return to the original position, the seat can be locked automatically. This prevents interference between the step bar and other bars of the stroller chassis during the rotation of the seat.

The direction changing mechanism according to the present invention may also find application for children's dining chairs (or high chairs). In this case, the fixed body may be a fixed plate provided on the child's chair frame, while the rotating body may be a seat attached to the fixed plate.

The foregoing detailed description of the present invention is a description for the understanding of the contents of the present invention by a person skilled in the relevant technical field, which also explains embodiments.

These explanations do not imply any limitation of the scope of protection of the present invention, and the present invention is in no way limited to the embodiments described. Any equivalent modifications or embellishments made in accordance with the teachings of the present Invention are also within the scope of protection of the present invention.

The invention claimed is:

1. A stroller comprising:
   a stroller chassis; and
   a child receiving device for receiving at least one child,
   wherein the child receiving device can be oriented in at least a first orientation and a second orientation, including a forward orientation and a rearward orientation, relative to the stroller chassis,
   wherein at least one receiving section of the child receiving device is movable in such a way that at least a first and a second position of the child receiving device can be set,
   wherein a coupling device is provided and designed in such a way that a transfer from the first orientation of the child receiving device to the second orientation is blocked in at least one first position of the child receiving device and released in at least a second position of the child receiving device, and
   wherein the child receiving device has at least two receiving sections which can be moved relative to one another, including at least one front section and at least one rear section,
   wherein the at least two receiving sections are movable relative to one another in such a way that the child receiving device can be transferred into a storage position, for which purpose the at least one front section can be pivoted upwards in such a way that a distal end of the at least one front section lies above a proximal end of the at least one front section,
   and wherein the transfer of the child receiving device between the first orientation into the second orientation is feasible by rotation of the child receiving device relative to the stroller chassis about an at least substantially vertical axis.

2. The stroller according to claim 1,
   wherein the child receiving device has the at least two receiving sections which can be moved relative to one another, in particular can be pivoted relative to one another,
   wherein the coupling device is provided and designed in such a way that the transfer from the first orientation of the child receiving device to the second orientation is blocked in the at least one first position of the at least two receiving sections relative to one another.

3. The stroller according to claim 1,
   wherein the transfer of the child receiving device between different orientations can be carried out without lifting the child receiving device relative to the stroller chassis and/or completely detaching the child receiving device from the stroller chassis.

4. The stroller according to claim 1,
   wherein a pusher for pushing the stroller extends at least in sections below a level of a buttocks section.

5. The stroller according to claim 1,
   wherein the child receiving device and the stroller chassis are connected to each other in/at a buttocks section and/or at an underside of the child receiving device.

6. The stroller according to claim 1,
   wherein the child receiving device can be moved into at least two positions of use,
   wherein a front receiving section, in particular leg section, of the child receiving device in the at least one first position of use extends at least essentially in a same direction as a rearwardly adjoining receiving section, in particular a buttocks section, of the child receiving device and/or wherein the front receiving section is in a second position of use extends in a bent manner downwards relative to a receiving section, in particular the buttocks section, adjoining to a rear, and/or the child receiving device can be brought into at least one non-use position in which the front receiving section and/or a rear receiving section is/are pivoted upwards and/or inwards relative to at least one position of use.

7. The stroller according to claim 1, wherein the at least one front section includes a leg section, and the at least one rear section includes a buttocks section, and in a non-use position, the at least one front section encloses an angle of less than 135° relative to the at least one rear section.

8. The stroller according to claim 1, wherein the child receiving device is detachable from the stroller chassis, wherein an actuating device for detaching the child receiving device is not accessible or is accessible with difficulty when the child receiving device is in a position of use.

9. The stroller according to claim 1, wherein the child receiving device comprises a seat attachment and/or a reclining attachment.

10. The stroller according to claim 1, wherein a transfer of at least one section of the child receiving device from the at least one first position into the second position is possible only after releasing a lock and/or the transfer of the at least one section of the child receiving device from a third position into a fourth position of the at least one section of the child receiving device is possible without releasing a locking device, in particular in a ratchet-like manner, wherein the third position corresponds to the second position and/or the fourth position corresponds to the at least one first position.

11. The stroller according to claim 1, wherein a downward movement, in particular a downward pivoting, of at least one section of the child receiving device is possible only after a lock has been released and/or an upward movement, in particular an upward pivoting, of at least one section of the child receiving device is possible without releasing the lock, in particular in a ratchet-like manner.

12. A method for adjusting the stroller according to claim 1, comprising:
the stroller chassis; and
the child receiving device for receiving the at least one child,
wherein the child receiving device can be oriented in the first orientation and the second orientation, in particular the forward orientation and the rearward orientation, relative to the stroller chassis,
wherein the child receiving device is moved at least in sections, in particular pivoted at least in sections, and the transfer from the first orientation of the child receiving device to the second orientation is thus enabled,
wherein the child receiving device is transferred from the first orientation, in particular the forward orientation, to the second orientation, in particular the rearward orientation, relative to the stroller chassis after release,
wherein the transfer of the child receiving device between the first orientation into the second orientation is feasible by rotation of the child receiving device relative to the stroller chassis about the at least substantially vertical axis.

13. The stroller according to claim 1, wherein the at least one first position of the child receiving device corresponds at least to a use position and/or the second position of the child receiving device corresponds to a non-use position.

14. The stroller according to claim 1, wherein the transfer of the child receiving device between the first orientation into the second orientation can take place when at least one operating element is actuated.

15. The stroller of claim 1 wherein the transfer of the child receiving device between the first orientation into the second orientation is exclusively feasible by rotation about the at least substantially vertical axis.

* * * * *